US010638745B2

(12) United States Patent
Werner et al.

(10) Patent No.: US 10,638,745 B2
(45) Date of Patent: May 5, 2020

(54) REPELLENT AND ATTRACTANT COMPOSITION FOR DICHROMATIC ANIMALS

(71) Applicants: The United States of America, Represented by the Secretary of Agriculture, Washington, DC (US); Arkion Life Sciences, LLC, New Castle, DE (US)

(72) Inventors: Scott J. Werner, Wellington, CO (US); Kenneth E. Ballinger, Jr., Kennett Square, PA (US)

(73) Assignees: Arkion Life Sciences, LLC, New Castle, DE (US); United States of America, as Represented by the Secretary of Agriculture, Washington, DC (US)

( * ) Notice: Subject to any disclaimer, the term of this patent is extended or adjusted under 35 U.S.C. 154(b) by 492 days.

(21) Appl. No.: 15/398,060

(22) Filed: Jan. 4, 2017

(65) Prior Publication Data

US 2017/0188566 A1 Jul. 6, 2017

Related U.S. Application Data

(60) Provisional application No. 62/274,467, filed on Jan. 4, 2016, provisional application No. 62/364,513, filed on Jul. 20, 2016.

(51) Int. Cl.
*A01N 25/00* (2006.01)
*A01M 29/08* (2011.01)
*A01N 35/06* (2006.01)

(52) U.S. Cl.
CPC .............. *A01M 29/08* (2013.01); *A01N 25/00* (2013.01); *A01N 35/06* (2013.01)

(58) Field of Classification Search
CPC ....... A01M 29/08; A01M 29/10; A01N 25/00; A01N 27/00; A01N 29/00; A01N 35/06; A01N 37/00
(Continued)

(56) References Cited

U.S. PATENT DOCUMENTS 2,547,722 A 4/1951 Stewart
3,663,253 A 5/1972 Stone
(Continued)

FOREIGN PATENT DOCUMENTS

EP 0152852 8/1985
GB 1601226 10/1981

OTHER PUBLICATIONS

International Preliminary Report on Patentability dated Jul. 19, 2018 based on co-pending International Application No. PCT/US2017/012125, filed Jan. 4, 2017—7 Pages.
(Continued)

*Primary Examiner* — David J Parsley
*Assistant Examiner* — Danielle A Clerkley
(74) *Attorney, Agent, or Firm* — McCarter & English, LLP

(57) ABSTRACT

The combination of a repellent agent or an attractant agent with a wavelength-specific visual cue agent has been found to produce an unexpected and synergistic effect of increased repellency or attraction in dichromatic animals who are not maximally sensitive to the wavelength of the repellent or attractant agent. The method of the invention may be used to repel dichromatic-animal pests; or to prevent or minimize monetary damage, particularly to agricultural products, natural resources or private property. The method of the invention may also be used to attract dichromatic animals for the purpose of agricultural production, recreational opportunities (e.g., wild-rodent feeders), or the effective
(Continued)

administration of target-animal pharmaceuticals or mitigation techniques.

6 Claims, 5 Drawing Sheets

(58) Field of Classification Search
USPC .................................. 119/174, 712; 424/405
See application file for complete search history.

(56) References Cited

U.S. PATENT DOCUMENTS

| | | | |
|---|---|---|---|
| 5,464,625 A | 11/1995 | Nolte et al. | |
| 5,549,902 A | 8/1996 | Preiser et al. | |
| 5,672,352 A | 9/1997 | Clark et al. | |
| 5,866,514 A * | 2/1999 | Sugisawa | A01N 25/02 504/113 |
| 6,328,986 B1 | 12/2001 | Ballinger, Jr. | |
| 6,436,423 B1 | 8/2002 | Ballinger, Jr. et al. | |
| 9,131,678 B1 | 9/2015 | Werner | |
| 2005/0186237 A1 | 8/2005 | Day et al. | |
| 2013/0156839 A1* | 6/2013 | Messina | A01N 37/06 424/410 |
| 2014/0352630 A1* | 12/2014 | Messina | A01N 65/00 119/712 |
| 2015/0196026 A1 | 7/2015 | Ballinger, Jr. et al. | |
| 2015/0359230 A1* | 12/2015 | Messina | A01N 25/00 424/731 |

OTHER PUBLICATIONS

Werner, Scott J., et al., "Anthraquinone Repellent to Reduce Take of Non-Target Birds from Zinc Phosphide Rodenticide Applications", Applied Animal Behaviour Science, 2011, vol. 135, pp. 146-153.
Animal Physiology: Adaptation and Environment, Fourth Edition, Chapter 13, Information and Senses, pp. 1-6.
Douglas, R.H., et al., "The Spectral Transmission of Ocular Media Suggests Ultraviolet Sensitivity is Widespread Among Mammals", Proceedings of the Royal Society of London B, 2014, vol. 281, pp. 1-9.
Werner, Scott J., et al. "Repellent Application Strategy for Wild Rodents and Cottontail Rabbits", Applied Animal Behaviour Science, 2016, vol. 185, pp. 95-102.
Werner, Scott J., et al., "Functional Significance of Ultraviolet Feeding Cues in Wild Turkeys", Physiology & Behavior, 2013, Jan. 1, 2013, pp. 1-6.
International Search Report based on International Application No. PCT/US2015/11193, dated Mar. 27, 2015—4 Pages.
International Search Report based on International Application No. PCT/US2014/48119, dated Oct. 9, 2014—4 Pages.

* cited by examiner

REPELLENT AND ATTRACTANT COMPOSITION FOR DICHROMATIC ANIMALS

CROSS-REFERENCE TO RELATED APPLICATIONS

The present application claims priority to U.S. Provisional Application No. 62/274,467, filed on Jan. 4, 2016 and U.S. Provisional Application No. 62/364,513, filed Jul. 20, 2016, the content of each is hereby incorporated by reference into this application.

RELATED FEDERALLY SPONSORED RESEARCH

The work described in this application was sponsored by the United States Department of Agriculture's National Wildlife Research Center in Fort Collins, Colo.

FIELD OF THE INVENTION

The invention relates to compositions and methods for repelling or attracting dichromatic animals from target foods or locations.

BACKGROUND OF THE INVENTION

Vision is fundamental to the everyday behavior of most animals, including mammals, birds and insects. Most animals use vision to facilitate their social interactions, orientation and foraging behavior. The visual system of humans has been characterized as trichromatic; human visual pigments are maximally sensitive to wavelengths in three regions reds, greens and blues). Most birds are tetrachromatic; bird visual pigments and oil droplets are ultraviolet- or violet-sensitive (UVS, VS), as well as the short-, medium- and long-wavelength sensitive cones also found in humans (SWS, MSW, LWS). In contrast, most all other animals are sensitive to only two wavelength regions and as such are categorized as dichromatic.

Vertebrates generally have a single rod photopigment and up to four classes of cone photopigment (i.e. long-, middle-, and two short-wave sensitive visual pigments; Cowan et al. 2002). Most mammals are dichromatic, having two classes of cone photopigment (i.e. long- and short-wave sensitive visual pigments; David-Gray et al. 2002). The short-wave sensitive (SWS) visual pigments of vertebrate cone photoreceptors are divided into two molecular classes, SWS1 and SWS2. Only the SWS1 class is present in mammals. The SWS1 class has been subdivided into violet-sensitive (VS; peak maximum absorbance, or $\lambda_{max}$=400-430 nm) and ultraviolet-sensitive visual pigments (UVS, $\lambda_{max}$<380 nm; Cowing et al. 2002). Although ultraviolet (UV) sensitivity is widespread among animals it is considered rare in mammals, being restricted to the few species that have $\lambda_{max}$<400 nm (Douglas and Jeffery 2014). Animals without UVS visual pigments, however, will be sensitive to UV wavelengths if they have ocular media that transmit UV wavelengths, as all visual pigments absorb significant amounts of UV if the energy level is sufficient (Douglas and Jeffery 2014)."

Although most animals are not maximally sensitive to full spectrum wavelengths (e.g. 300-1,400 nm), implications of this technology include behavioral responsiveness (e.g. 5% repellency or attraction) among dichromatic animals to wavelengths for which they are not maximally sensitive. This invention exploits the novel and non-obvious observation of behavioral responsiveness among dichromatic animals to wavelengths for which they are not maximally sensitive (e.g., <400 nm, >700 nm). This use of wavelengths independent of those that characterize dichromatic vision has implications for a myriad of applications for repellents and attractants of dichromatic animals.

SUMMARY OF THE INVENTION in accordance with this discovery, it is an object of this invention to provide improved methods and compositions for repelling and attracting dichromatic animals from a target.

An object of the invention is to provide a method for decreasing the behavioral response of a dichromatic animal associated with a target comprising: providing a repellent composition comprising a wavelength-specific visual cue agent and a repellent agent wherein the wavelength-specific visual cue agent has spectral characteristics sufficiently similar to the spectral characteristics of the repellent agent and wherein the spectral characteristics of the repellent agent fall outside of the ranges within which said dichromatic animal is maximally sensitive; applying said repellent composition to said target, presenting said target to said dichromatic animal, whereby said dichromatic animal's behavioral response associated with said target is decreased at a level of at least 5% greater than when said dichromatic animal is presented with a target upon which is applied a composition comprising only one of said wavelength-specific visual cue agent or said repellent agent, or comprising significantly lower amounts of either (or both) said wavelength-specific visual cue agent or said repellent agent. The visual cue agent can be applied at an amount effective to be visibly recognized by said dichromatic animals.

A further object of the invention is a method for decreasing the behavioral response of a dichromatic animal associated with a target via a repellent application selected from the group consisting of: (a) an initial application of an effective amount of a repellent agent to said target, and one or more subsequent applications to said target of an effective amount of a wavelength-specific visual cue agent in combination with the same amount or a reduced amount of the repellent agent; or (b) an initial application of an effective amount of a repellent agent to said target, and one or more subsequent applications to said target of effective amounts of a wavelength-specific visual cue agent; or (c) one or more concurrent applications of an effective amount of a repellent agent and an effective amount of a wavelength-specific visual cue agent.

Another object of the invention is a method for increasing the behavioral response of a dichromatic animal associated with a target comprising: providing an attractant composition comprising a wavelength-specific visual cue agent and an attractant agent wherein the wavelength-specific visual cue agent has spectral characteristics sufficiently similar to the spectral characteristics of the attractant agent and wherein the spectral characteristics of the attractant agent fall outside of the ranges within which said dichromatic animal is maximally sensitive; applying said attractant composition to said target, presenting said target to said dichromatic animal, whereby said dichromatic animal's behavioral response associated with said target is increased at a level of at least 5% greater than when said dichromatic animal is presented with a target upon which is applied a composition comprising only one of said wavelength-specific visual cue agent or said attractant agent.

Another object of the invention is a method for increasing the behavioral response of a dichromatic animal associated with a target via an attractant application selected from the group consisting of: (a) an initial application of an effective amount of attractant agent to said target, and one or more subsequent applications to said target of an effective amount of a wavelength-specific visual cue agent in combination with the same amount or a reduced amount of the attractant agent; or (b) an initial application of an effective amount of an attractant agent to said target, and one or more subsequent applications to said target of effective amounts of a wavelength-specific visual cue agent; or (c) one or more concurrent applications of an effective amount of an attractant agent and an effective amount of a wavelength-specific visual cue agent.

Another object of the invention is a method for changing the behavioral response of a dichromatic animal associated with a target comprising providing a composition comprising a wavelength-specific visual cue agent and an agent wherein the wavelength-specific visual cue agent has spectral characteristics sufficiently similar to the spectral characteristics of the agent and wherein the spectral characteristics of the agent fall outside of the ranges within which said dichromatic animal is maximally sensitive, applying said composition to said target, presenting said target to said dichromatic animal, whereby said dichromatic animal's behavioral response associated with said target is changed at a level of at least 5% greater than when said dichromatic animal is presented with a target upon which is applied a composition comprising only one of said wavelength-specific visual cue agent or said agent. The change can be a decrease in the behavioral response, wherein the composition is a repellent composition and the agent is a repellent agent. The change can be an increase in the behavioral response, wherein the composition is an attractant composition and the agent is an attractant agent.

Other objects and advantages of this invention will become readily apparent from the ensuing description.

DETAILED DESCRIPTION OF THE INVENTION

Figure 1:
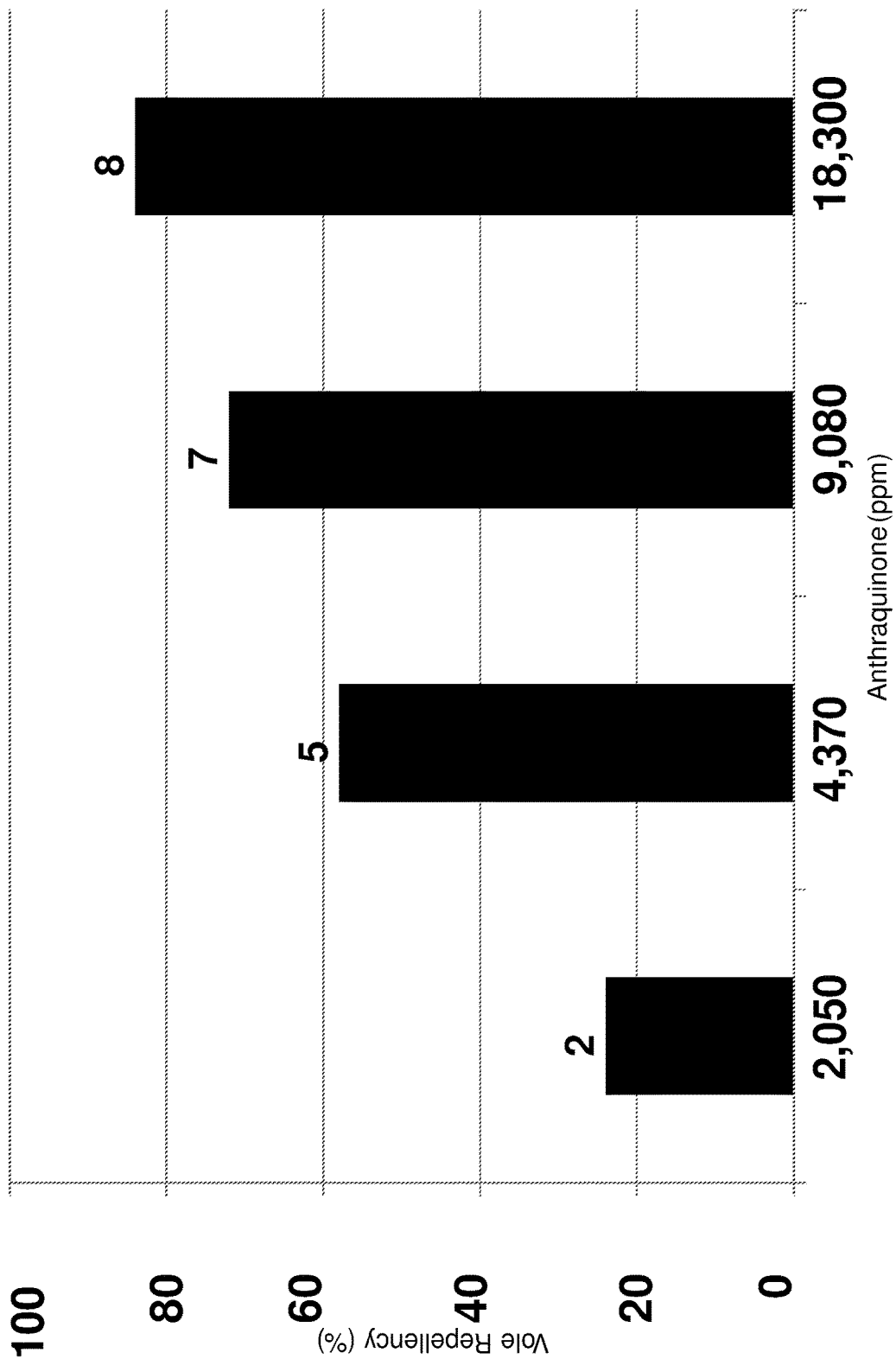
FIG. 1 is a bar graph that illustrates repellency of an UV-absorbent, postingestive repellent in a dichromatic animal, the California vole (*Microtus californicus* Peale). Mean feeding repellency associated with varying concentrations of an anthraquinone-based repellent (Avipel® Shield; Arkion® Life Sciences, New Castle, Del., USA) offered to California voles (*Microtus californicus* Peale). Repellency represents test consumption (day 4) relative to average, pretreatment consumption (days 1-3) of untreated whole oats (n=8-10 voles per repellent concentration).

The present disclosure is directed to combinations of a visual cue agent and a rodent attractant or repellent composition which have been found to produce an unexpected and synergistic effect of increased repellency or attraction in dichromatic animals. The synergy of this invention is characterized by greater behavioral response (e.g. ≥5% repellency or attraction) to the combination of a visual cue and a repellent, or a visual cue and an attractant, relative to the behavioral response observed for the visual cue agent and repellent or attractant when presented independently (i.e. not in combination). The method of the invention may be used to repel dichromatic-animal pests; or to prevent or minimize monetary damage, particularly to agricultural products, natural resources, or private property. The method of the invention may also be used to attract dichromatic animals for the purpose of agricultural production, recreational opportunities (e.g. wild rodent feeders), or the effective administration of target-animal pharmaceuticals or mitigation techniques.

In contrast to the prior art of an Ultraviolet Strategy for Avian Repellency (i.e. tetrachromatic animals; U.S. Pat. No. 9,131,678), the methods and compositions of this invention are effective for and applicable to decreasing or increasing the behavioral response of dichromatic animals associated with a target (i.e. food or location) of interest using repellent or attractant agents having spectral characteristics outside the range within which dichromatic animals are maximally sensitive (e.g. wavelengths of <400 nm, >700 nm). In contrast to repelling rodents with a polycyclic quinone (i.e. Method for Repelling Rodents; U.S. patent application Ser. No. 14/595,718), the methods and compositions of this invention are effective for and applicable to decreasing or increasing the behavioral response of dichromatic animals associated with a target that comprises the use of a combination of a wavelength-specific visual cue agent and a repellent or attractant agent.

In particular, the present disclosure is directed to improved compositions and methods for repelling and attracting dichromatic animals by use of wavelength-specific repellent and attractant agents in combination with visual cue agents, and in certain cases, visual cue agents alone.

In one embodiment of the present disclosure, a repellent agent can be used in combination with wavelength-specific visual cue agents that exhibit spectral characteristics sufficiently similar to those of the repellent agent such that dichromatic animals do not visibly differentiate between the agents (e.g. ±10-50 nm), the amount of the repellent agent may be reduced while maintaining the ability to effectively repel dichromatic animals (e.g. ≤95% of the amount of the repellent agent necessary to achieve ≥5% repellency without this invention, or when the repellent or attractant agent is used without a visual cue agent).

In an alternative embodiment, an attractant agent can be used in combination with wavelength-specific visual cue agents that exhibit spectral characteristics sufficiently similar to those of the attractant agent such that dichromatic animals do not visibly differentiate between the agents (e.g. ±10-50 nm), the amount of the attractant agent may be reduced while maintaining the ability to effectively attract dichromatic animals (e.g. ≤95% of the amount of the attractant agent necessary to achieve ≥5% attraction without this invention, or when the attractant agent is used without a visual cue agent).

One surprising finding of the present disclosure is that dichromatic animals, which are not maximally sensitive to UV or infrared (IR) signals, are in fact responding behaviorally to UV or IR signals when presented in accordance with the present disclosure. Dichromatic animals are not maximally sensitive to wavelengths which are either less than 400 nm or greater than 700 nm. However, when repellent or attractant agents are presented on a target in combination with a visual cue agent exhibiting spectral characteristics sufficiently similar to the agent, but falling outside of the ranges to which dichromatic animals are sensitive, the dichromatic animals unexpectedly respond behaviorally by exhibiting a decreased behavioral response when presented with a repellent agent or an increased behavioral response when presented with an attractant agent in accordance with the present disclosure.

As used herein, the term "repellency" means the percent decrease in consumption (or occupancy) of treated target relative to untreated target. The term "effective repellency" means at least 5% decrease in consumption (or occupancy) of treated target relative to untreated target. The effective repellency as contemplated herein can be 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 14%, 35%, 16%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% decrease in consumption (or occupancy) of treated target relative to untreated target. These values can be used to define a range, such as 50% to 75%, or 75% to 85%, or 25% to 50% decrease in consumption (or occupancy) of treated target relative to untreated target.

As used herein, the term "attraction" means the percent increase in consumption (or occupancy) of treated target relative to untreated target. The term "effective attraction" means at least 5% increase in consumption (or occupancy) of treated target relative to untreated target. The effective attraction as contemplated herein can be 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 13%, 34%, 35%, 16%, 37%, 38%, 39%, 40%, 41%, 42%, 43%, 44%, 45%, 46%, 47%, 48%, 49%, 50%, 51%, 52%, 53%, 54%, 55%, 56%, 57%, 56%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% increase in consumption (or occupancy) of treated target relative to untreated target. These values can be used to define a range, such as 50% to 75%, or 75% to 85%, or 25% to 50% increase in consumption (or occupancy) of treated target relative to untreated target.

The term "relevant behavioral response" as used herein refers to the dichromatic animal's reaction to either effective repellency or effective attraction. For example, when a dichromatic animal exhibits a relevant behavioral response of decreased consumption (or occupancy) of treated target relative to untreated target, that response is the result of effective repellency. Alternatively, when a dichromatic animal exhibits a relevant behavioral response of increased consumption (or occupancy) of treated target relative to untreated target, that response is the result of effective attraction. In addition, the percentage values provided in the two paragraphs preceding this one can be used with the term "relevant behavioral response." For example, 50% repellency is equivalent to a behavioral response at a level of 50% decreased consumption (or occupancy) of treated target relative to untreated target.

In accordance with the present disclosure, the methods for repelling dichromatic animals from a target can be accomplished by at least any of the following approaches: (i) the application of a wavelength-specific visual cue agent to a target in an amount effective to repel dichromatic animals; (ii) the application of an initial treatment of a wavelength-specific repellent agent to the target in an amount effective to repel dichromatic animals, and the subsequent application of a wavelength-specific visual cue agent in combination with same or reduced application rate of the repellent; (iii) the application of an initial treatment of a wavelength-specific repellent agent to the target in an amount effective to repel dichromatic animals, and the subsequent application of a wavelength-specific visual cue agent without further application of the repellent; and (iv) the concurrent application of a wavelength-specific repellent agent, and a wavelength-specific visual cue agent to the target in an amount effective to repel dichromatic animals of interest. For each of these applications, the visual cue agent is applied at an amount sufficient for eliciting a relevant behavioral response in the dichromatic animal of interest.

Repellent agents which are suitable for use in the present disclosure include but are not limited to anthraquinones, anthranilates, methiocarb, caffeine, chlorpyrifos, cyhalothrin, methyl phenyl acetate, ethyl phenyl acetate, o-amino acerophenone, 2-amino-4,5-dimethyl ecetophenone, veratroyl amine, cinnamic aldehyde, cinnamic acid, cirmamide, allyl isothiocyanate, capsaicin, TRPV1, denatonium benzoate, quebracho, sucrose octaacetate, quinine, quinine hydrochloride, magnesium sulfate, o-aminoacetophenone, emetine dihydrochloride, aluminum ammonium sulphate, putrescent and volatile animal products (e.g. eggs, urine, blood meal, castor oil), putrescent and volatile plant products (e.g. pine needle oil, garlic oil, sinigrin), d-pulegone, thiram, glucosinolate, polygodial, piperine (e.g. *Zanthoxylum piperitum*), and combinations thereof.

In accordance with the present disclosure, the methods for attracting dichromatic animals from a target can be accomplished by at least any of the following approaches: (i) the application of a wavelength-specific visual cue agent to a target in an amount effective to attract dichromatic animals; (ii) the application of an initial treatment of a wavelength-specific attractant agent to the target in an amount effective to attract dichromatic animals, and the subsequent application of a wavelength-specific visual cue agent in combination with same or reduced application rate of the attractant; (iii) the application of an initial treatment of a wavelength-specific attractant agent to the target in an amount effective to attract dichromatic animals, and the subsequent application of a wavelength-specific visual cue agent without further application of the attractant; and (iv) the concurrent application of a wavelength-specific attractant agent, and a wavelength-specific visual cue agent to the target in an amount effective to attract dichromatic animals of interest. For each of these applications, the visual cue agent is applied at an amount sufficient for eliciting a relevant behavioral response in the dichromatic animal of interest.

Attractant agents which are suitable for use in the present disclosure include but are not limited to food-based agents (e.g. grains and grain products, seeds and seed products, nuts and nut products, nut butter, fruit and fruit products, dairy products, confectionery ingredients), energy (e.g. plant fats, animal fats), protein, and combinations thereof.

As stated above, the visual cue agent preferably exhibits spectral characteristics sufficiently similar to those of the repellent or attractant agent depending upon which it is being used with. Spectral characteristics include reflectants, absorbents, refractants as well as UV and IR wavelengths. It is preferred that the visual cue agent exhibit the spectral characteristics within 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 nm of the spectral characteristics of the repellent or attractant agent. These values can be used to define a range, such as a visual cue agent exhibiting spectral characteristics within the range of 10 to 15 nm, or 20 to 35 nm, or 40 to 50 nm of the spectral characteristics of the repellent or attractant agent. Suitable visual cue agents of the present disclosure preferably exhibit spectral characteristics sufficiently similar to the previously or concurrently-applied repellent or attractant treatment such that the dichromatic animal of interest preferably does not visually differentiate between the visual cue agent and the repellent or attractant agent or the formulation of the first treatment formulation containing the repellent or attractant agent. For example, by way of illustration and without being limited thereto, one effective repellent, anthraquinone, exhibits UV-A (320-400 nm) and/or UV-B (280-320 nm) absorbance. For purposes of the present disclosure, a suitable visual cue agent could exhibit UV or IR absorbance, reflectance or refraction at or sufficiently near the wavelengths of the repellent or attractant agent (e.g. ±10-50 nm as described above). The UV or IR spectra of repellent or attractant agents and visual cue agents may be readily determined using conventional spectroscopic analysis techniques.

Some examples of visual cue agents for use in the present disclosure include, but are not limited to, titanium (IV) oxides ($TiO_2$), trisiloxanes, siloxanes, other UV-absorbent and UV-reflective agents (100-400 nm), and infrared agents (>700 nm).

In certain embodiments, the present disclosure provides improved methods and compositions for repelling dichromatic animals using reduced amounts of the repellent agent applied throughout the period of needed repellency (e.g. ≤95% of the amount of the repellent agent necessary to achieve ≥5% repellency without this invention).

In other embodiments, the present disclosure provides improved methods and compositions for repelling dichromatic animals utilizing multiple applications of repellent agents wherein the amount of the repellent agents may be reduced after the initial application (e.g. 95% of the amount of the repellent agent associated with its initial application).

In one embodiment of the present disclosure, the use of repellent agents in combination with wavelength-specific visual cue agents that exhibit spectral characteristics sufficiently similar to the repellent agent such that the amount of the repellent agent may be reduced as compared to previously-applied repellent agent while maintaining the ability to maintain effective repellency of dichromatic animals (e.g. ≤95% of the amount of the repellent or attractant agent associated with its initial application).

In alternative embodiments, the present disclosure provides improved methods and compositions for attracting dichromatic animals using reduced amounts of the attractant agent applied throughout the period of needed attraction (e.g. ≤95% of the amount of the repellent or attractant agent necessary to achieve ≥5% attraction without this invention).

In other embodiments, the present disclosure provides improved methods and compositions for attracting dichromatic animals utilizing multiple applications of attractant agents wherein the amount of the attractant agents may be reduced after the initial application (e.g. ≤95% of the amount of the attractant agent associated with its initial application).

In an alternative embodiment of the present disclosure, the use of attractant agents in combination with wavelength-specific visual cue agents that exhibit spectral characteristics sufficiently similar to the attractant agent such that the amount of the attractant agent may be reduced as compared to previously-applied attractant agent while maintaining the ability to maintain effective attraction of dichromatic animals (e.g. ≤95% of the amount of the repellent or attractant agent associated with its initial application).

In one embodiment of the present disclosure, the amount of the desired repellent or attractant agent used may vary from the initial application to subsequent applications. In this embodiment, the amount of the repellent or attractant agent to be used in the initial application (as well as any subsequent applications in the absence of visual cue agent) is selected to effectively repel or attract the dichromatic animal from a treated target (i.e. food or location). Thus, as used herein, an "effective amount" is defined as that amount which results in "effective repellency" or "effective attraction" as previously defined herein. The effective amount may vary depending upon the particular repellent or attractant agent that is selected, as well as the following additional variables: the formulation of the repellent/attractant, the specific dichromatic animal of interest, the target material and environmental factors (e.g. context of the application including alternative foods and locations, behavioral history). Effective amounts of repellent agents and attractant agents can be 100, 150, 200, 250, 300, 350, 400, 450, 500, 550, 600, 650, 700, 750, 800, 850, 900, 950, 1000, 1500, 2000, 2500, 3000, 3500, 4000, 4500, 5000, 5500, 6000, 6500, 7000, 7500, 8000, 8500, 9000, 9500, 10,000, 15,000, 20,000, 25,000, 30,000, 35,000, 40,000, 45,000, or 50,000 ppm. These values can be used to define a range, such as effective amounts in the range of 5000 to 20,000 ppm, or 1000 to 7500 ppm of repellent or attractant.

The effective amount can be readily determined by routine controlled experimentation. By way of example and without being limited thereto, in the initial application, preferred amounts of anthraquinone (AVIREL® SHIELD, FLIGHT CONTROL® PLUS, AV-1011, AV2022 or AV-4044) are approximately 1-2% active ingredient (wt/wt) for most dichromatic animals, but may be as low as 0.01% active ingredient (wt/wt).

The term "subsequent applications" it is intended to be those applications wherein the repellent or attractant agent is combined with the desired visual cue agent after the initial application of the repellent or attractant agent. In certain embodiments, the amount of the repellent or attractant agent used in the subsequent applications can be the same as the initial application. Alternatively, in certain embodiments, the amount of the repellent or attractant agent used in the subsequent applications can be reduced. In these subsequent applications, reduced amounts of the repellent or attractant agent may be 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 77%, 26%, 25%, 24%, 73%, 22%, 21%, 70%, 19%, 18%, 17%, 16%, 15%, 14%, 13%, 12%, 11%, 10%, 9%, 8%, 7%, 6%, 5%, 4%, 3%, 2%, or 1% (wt/wt) of repellent or attractant agent. These values can be used to define a range such as 95%-50% of repellent or attractant. It is further contemplated that the repellent or attractant can be reduced to as low as 0.01%, 0.07%, 0.03%, 0.04%, 0.05%, 0.06%, 0.07%, 0.08%, 0.09%, 0.1%, 0.1%, 0.2%, 0.3%, 0.4%, 0.5%, 0.6%, 0.7%, 0.8%, or 0.9%, (wt/wt) of repellent or attractant agent. These values can be used to define a range, such as 0.01-0.1% (wt/wt) of repellent or attractant agent. In even further embodiments, the amount of the repellent or attractant agent used in the subsequent applications can omitted completely.

It is further contemplated by the present disclosure that in certain embodiments, the one or more desired visual cue agent(s) used in combination with the original or reduced amount of repellent or attractant agent is applied in amounts that are effective in at least maintaining the level of effective repellency or effective attraction that was accomplished by the repellent or attractant alone. The synergy of this invention is characterized by greater behavioral response to the combination of a visual cue and a repellent or a visual cue and an attractant, relative to the behavioral response observed for the visual cue, the repellent or the attractant when applied independently (not in combination). The effective amount (having the same meaning as previously provided) of the visual cue agent may vary depending upon the particular repellent or attractant agent that is selected, as well as the following additional variables: the formulation of the repellent/attractant, the specific dichromatic animal of interest, the target material and environmental factors (e.g. context of the application including alternative foods and locations, behavioral history). Effective amounts of visual cue agents can be 100, 150, 200, 250, 300, 350, 400, 450, 500, 550, 600, 650, 700, 750, 800, 850, 900, 950, 1000, 1500, 2000, 2500, 3000, 3500, 4000, 4500, 5000, 5500, 6000, 6500, 7000, 7500, 8000, 8500, 9000, 9500, 10,000, 15,000, 20,000, 25,000, 30,000, 35,000, 40,000, 45,000, or 50,000 ppm. These values can be used to define a range, such as effective amounts in the range of 2000 to 5000 ppm, or 4000 to 7000 ppm.

By way, of example and without being limited thereto, one effective visual cue agent is titanium (IV) oxide, and effective amounts of titanium (IV) oxide may vary from 2,000 to 5,000 ppm (AEROXIDE® P25, Evonik Goldschmidt Corp., Hopewell, Va.) to 3,500 to 5,000 ppm (Catalog no. 232033 available from Aldrich, St, Louis, Mo.) to 4,000 to 7,000 ppm (Catalog no. 808 available from Merck & Co., Whitehouse Station, N.J.; HOMBIKAT UV 100 available from Sachtleben, Duisburg, Germany; Catalog no. 89490 available from Aldrich, St. Louis, Mo.; Catalog no. T315-500 available from Fisher Scientific, Pittsburgh Pa.).

In certain embodiments, the repellent and attractant agents may be formulated with one or more suitable inert carriers as is well known in the art. Formulations of repellent and attractant agents as well as the visual cue agents may vary with the particular target and method of application. The repellent, attractant and visual cue agents may, for example, be formulated as solutions, emulsions, emulsifiable concentrates, suspension concentrates, wettable powders, dusts, granules, adherent dusts or granules, and aerosols. Of greatest interest are those carriers which are agronomically acceptable and those suitable for application onto structures, agricultural fields or crops, seeds, seedlings, orchards, vineyards, livestock feed, fertilizers, pesticides, animal or insect baits, and combinations thereof. The particular carrier selected is not critical, and a variety of liquid and solid phase carriers may be used, including but not limited to water, aqueous surfactant mixtures, alcohols, ethers, hydrocarbons, halogenated hydrocarbons, glycols, ketones, esters, oils (natural or synthetic), clays, kaolinite, silicas, cellulose, rubber, talc, vermiculite, and synthetic polymers. The repellent and attractant agents, and the visual cue agent may also be formulated in a single composition or formulated in different compositions and applied separately. The repellent and attractant agents and/or the visual cue agent may also be formulated in admixture with other agriculturally beneficial agents, including but not limited to, UV or IR stabilizers, antioxidants, baits, adjuvants, herbicidal agents, fertilizers, and pesticides including insecticides and fungicides.

The method of the invention may be used to repel or attract dichromatic animals anywhere they pose a nuisance or, more importantly, to prevent or minimize economic damage, particularly to agricultural products, natural resources, or private property. The repellent and attractant agents, and the visual cue agent may be applied on any target or spatial location of concern from (to) which dichromatic animals are to be repelled (or attracted). In accordance with this invention, preferred targets for application include, but are not limited to, one or more of structures, agricultural fields or crops, seeds, seedlings, orchards, vineyards, livestock feed, fertilizers, pesticides, animal or insect baits, and combinations thereof. Crops include, but are not limited to, one or more of corn, fruit, grains, grasses, legumes, lettuce, millet, oats, rice, row crops, sorghum, sunflower, tree nuts, turf, vegetables, and wheat.

The subsequent treatments of the target with the repellent or attractant agent, and the visual cue agent are typically applied at any time following the initial application desired by the user. For instance, in one anticipated embodiment, the subsequent treatments are applied during periods when heavier damage is anticipated. In practice, the subsequent treatment is typically applied at least one week after the first treatment (in the same growing season).

Dichromatic animals are those animals that use only two distinct types of photoreceptors for color vision, generally including placental mammals and excluding sea mammals (pinnipeds and cetaceans, monochromats), primates closely related to humans (i.e. trichromats) and most birds (tetrachromats).

Targets comprise structures, agricultural fields or crops, seeds, seedlings, orchards, vineyards, livestock feed, fertilizers, pesticides, animal or insect baits, or combinations thereof. Crops comprise corn, fruit, grains, grasses, legumes, lettuce, millet, oats, rice, row crops, sorghum, sunflower, tree nuts, turf, vegetables, or wheat.

The following examples are intended only to further illustrate the invention and are not intended to limit the scope of the invention which is defined by the claims.

EXAMPLES

It is understood that the foregoing detailed descriptions are given merely by way of illustration and that modifications and variations may be made therein without departing from the spirit and scope of the invention.

Examples—Repellent Application Strategy for Wild Rodents and Cottontail Rabbits Effective chemical repellents and repellent application strategies are needed to manage damages caused by wild rodents and rabbits to agricultural resources. For the purpose of comparatively investigating the behavioral response of wild rodents and rabbits to a chemical repellent, the concentration-response relationship of an anthraquinone-based repellent in California voles (*Microtus californicus* Peale), Richardson's ground squirrels (*Urocitellus richardsonii* Sabine), deer mice (*Peromyscus maniculatus* Wagner) and cottontail rabbits (*Sylvilagus audubonii* Baird) in captivity were evaluated. 52-56% feeding repellency for whole oats treated with 10,800 ppm anthraquinone or 18,500 ppm anthraquinone was observed in mice and squirrels, and 84-85% repellency for oats treated with 18,300 ppm anthraquinone or 19,600 ppm anthraquinone was observed in voles and rabbits, respectively. In addition to providing the negative postingestive consequences necessary for conditioned food avoidance, the anthraquinone-based repellent also absorbs ultraviolet (UV) wavelengths that are visible to most wild birds. For the purpose of developing a repellent application strategy to modify the behavior of vertebrate pests, a conditioned avoidance experiment was conducted by offering repellent- and UV-treated food to California voles in a subsequent behavioral assay. Relative to unconditioned test subjects ($P=0.3161$), voles conditioned with the UV, postingestive repellent subsequently avoided whole oats treated only with an UV cue ($P=0.0109$). These behavioral responses to anthraquinone-based repellents and UV feeding cues are exploited as a repellent application strategy for wild mammals. Preplant seed treatments and surface treatments that include postingestive repellents and related visual cues can be used for the protection of agricultural resources associated with mammalian depredation.

The opportunistic feeding behavior and fecundity of some wild rodents and rabbits cause economic losses annually to world-wide agricultural production (Gebhardt et al., 2011, Jacob and Tkadlec, 2010, Johnson and Timm, 1987, Pelz, 2004, Salmon, 2008 and Witmer and Singleton, 2010). For example, voles (*Microtus* spp. Schrank and *Arvicola* spp. La Cépède) are known to cause damage in the United States of America and Europe to agricultural crops such as alfalfa, peas and wheat, and reforestation efforts (Baldwin, 2014, Giusti, 2004, Jacob and Tkadlec, 2010, Sullivan and Sullivan, 2008 and Witmer et at, 2007). Ground squirrels (*Spermophilus* spp. Cuvier) cause millions of dollars of damage to alfalfa production in the western United States and Canada (Johnson-Nistler et al., 2005 and Proulx, 2010). Ground squirrels caused $17.9-23.9 million in crop losses and $11.9-17.9 million (dollars projected for 2016 valuation) in physical damages to materials such as structures, levees and earthen dams as well as damages to nut crops, tree fruits and rangeland forage (Baldwin et al., 2013, Marsh, 1998). Deer mice (*Peromyscus* spp. Gloger) cause damage to corn, almonds, avocados, citrus, pomegranate and sugar beet crops (Pearson et al., 2000 and Witmer and Moulton, 2012). Cottontail rabbits (*Sylvilagus floridanus* Allen) damage tree seedlings, shrubs, hay, soybean and rangeland forage (Dugger et al., 2004, Johnson and Timm, 1987).

Agricultural depredation caused by wild rodents and rabbits is a persistent problem with few cost-effective solutions. Methods to alleviate damage caused by wild rodents and rabbits include behavioral applications (e.g. physical exclusion, chemical repellents) and lethal removal. The need for effective solutions to mammal depredation remains despite prior evaluations of numerous chemical repellents (Agnello et al., 2014, Baldwin et al., 2014, Gurney et al., 1996, Nolte and Barnett, 2000, Nolte et al., 1993, Sutherland, 2000 and Williams and Short, 2014). The effectiveness and commercial development of wildlife repellents are dependent upon the repellent's efficacy under field conditions, cost relative to expected damages of unprotected resources, environmental impacts, and food and feed safety (Werner et al., 2009).

Although anthraquinone is a naturally-occurring compound that was identified as a promising avian repellent in the early 1940s (Heckmanns and Meisenheimer, 1944), an anthraquinone-based seed treatment (AV-1011; Arkion® Life Sciences, New Castle, Del. USA) was first registered by the United States Environmental Protection Agency for the protection of newly-planted rice in January 2016. Anthraquinone has been used to effectively repel blackbirds (Avery et al., 1997, 1998; Carlson et al., 2013; Cummings et al., 2002a,b, 2011; Neff and Meanley, 1957; Werner et al., 2009, 2011a, 2014b,c), Canada geese (*Brania canadensis* Linnaeus; Blackwell et al., 1999; Dolbeer et al., 1998; Werner et al., 2009), sandhill cranes (*Grus canadensis* Linnaeus; Blackwell et al., 2001), ring-necked pheasants (*Phasianus colchicus* Linnaeus; Werner et al, 2009), European starlings (*Sturnus vulgaris* Linnaeus; Tupper et al., 2014), wild turkeys (*Meleagris gallopavo* Linnaeus; Werner et al., 2014a), horned larks (*Eremophila alpestris* Linnaeus), great-tailed grackles (*Quiscalas mexicanus* Gmelin) and American crows (*Corvus brachyrhynchos* Brehm; Werner et al., 2015).

Relatively few studies, however, have evaluated anthraquinone as a mammalian repellent. Santilli et al, (2005) discovered that wild boar (*Sus scrofa* Linnaeus) consumed 86.5% less corn treated with 0.64% anthraquinone than untreated corn. Werner et al. (2011b) observed 24-37% repellency in black-tailed prairie dogs (*Cynomys ludovicianus* Ord) offered corn seeds treated with 0.5-4.0% anthraquinone. Cowan et al. (2015) observed an aversion to anthraquinone-treated baits in black rats (*Rattus rattus* Linnaeus; 0.1% and 0.25% anthraquinone) and possums (*Trichosurus vulpecula* Kerr; 0.25% anthraquinone). Relative to the consumption of control baits (0.01-0.03% cinnamon, green carrots), the consumption of anthraquinone-treated baits was less in brown rats (*R. norvegicus* Berkenhout; 0.04% and 0.08% anthraquinone) and no different in possums (*T. vulpecula*, 0.08% anthraquinone; Clapperton et al., 2015). Although Hansen et al. (2015) observed that female common voles (*M. arvalis* Pallas) consumed 47% less wheat treated with 5% anthraquinone and chloroform than wheat treated only with chloroform, Hansen et al., (12016) found no difference in consumption of wheat treated with 15% anthraquinone and chloroform in male common voles and greater consumption of wheat treated with 15% anthraquinone and chloroform in male house mice (*Mus musculus* Linnaeus) relative to wheat treated only with chloroform.

Comparative investigation was performed on the behavioral response of wild rodents and rabbits to a chemical repellent, and an effective application strategy for the protection of agricultural resources commonly damaged by these wild mammals was developed. The investigation included (1) experimentally evaluating the concentration-response relationship of an anthraquinone-based repellent for California voles (*M. californicus* Peale), Richardson's ground squirrels (*Urocitellus richardsonii* Sabine), deer mice (*P. maniculatus* Wagner) and cottontail rabbits (*S. audubonii* Baird), and (2) developing a repellent application strategy by exploiting the behavioral responses of wild rodents and rabbits to anthraquinone-based repellents and associated visual cues. The investigation also included the conditioned avoidance of UV visual cues subsequent to exposure to an UV, postingestive repellent in California voles.

Four concentration-response feeding experiments were conducted at the headquarters of the National Wildlife Research Center (NWRC) in Fort Collins, Colo. (USA). 38 California voles were captured adjacent to commercial artichoke fields in California USA, 28 Richardson's ground squirrels within alfalfa fields in Montana, and 34 deer mice and 30 cottontail rabbits adjacent to NWRC-Fort Collins using appropriate Scientific Collection Permits, 8-10 test subjects per treatment group were used (Werner et al. 2009, 2011b) and thus 3-4 concentrations for each of the four tested species based upon the availability of test subjects subsequent to live-captures. The capture, care and use of all test subjects associated with each experiment were approved by the NWRC Animal Care and Use Committee (NWRC Study Protocols QA-2104, QA-2243, QA-2333; S. J. Werner-Study Director).

All test subjects were offered a maintenance diet for at least one week prior to each of the feeding experiments (i.e. quarantine, holding). For the purpose of comparatively investigating the intra- and interspecific efficacy of a chemical repellent, all test subjects were maintained within individual cages throughout the experiments (quarantine, holding, acclimation, pre-test, test). California voles, Richardson's ground squirrels and cottontail rabbits were maintained within visually-isolated, individual cages (23× 41×18-cm cages for voles, 62×50×42-cm for ground squirrels, 62×50×42-cm for rabbits) in an NWRC indoor animal research building. Deer mice were maintained within individual cages (46×24×19-cm) in the NWRC outdoor animal research facility throughout the experiment to reduce the potential exposure of researchers to hantavirus. Free access to water and environmental enrichment were provided to all test subjects throughout the feeding experiments.

An anthraquinone-based repellent (Avipel® Shield, active ingredient: synthetic 9,10-anthraquinone; Arkion® Life Sciences, New Castle, Del., USA) was used for each of the experiments (Werner et al., 2009, 2010, 2011a,b). Seed treatments for all concentration-response experiments were formulated by applying aqueous suspensions (100 ml/kg) to the test diet using a rotating mixer and household spray equipment (Werner et al., 2014a). The test diet for each of the concentration-response feeding experiments was whole oats. Without wishing to be bound, it is believed that repellency is directly related to repellent concentration during the concentration-response experiments. ≥80% repellency was operationally defined as efficacious during the laboratory feeding experiments (Werner et al., 2009, 2011a, 2014a,b,c). As such, consumption of efficacious treatments (i.e. threshold repellency) is ≥20% of average, pre-test consumption during the concentration-response experiments.

For each test group, the dependent measure of the concentration-response experiments was calculated as average test consumption of treated test diet relative to average, pre-test consumption of untreated test diet (i.e. percent repellency). The NWRC Analytical Chemistry Unit used high performance liquid chromatography to quantify actual anthraquinone concentrations (±10-100 ppm AQ) among the anthraquinone-treated test diets (Werner et al., 2009, 2011a, 2014a,b,c, 2015). A non-linear regression procedure was used (SAS v9.1) to analyze percent repellency as a function of actual anthraquinone concentration (ppm). When non-linear relationships were observed for repellency and repellent concentration ($\alpha \leq 0.05$), it was predicted that the threshold anthraquinone concentration needed to achieve 80% feeding repellency. Descriptive statistics were used ($\bar{x} \pm S.E.M.$) to summarize anthraquinone dosage for observed threshold repellency (mg anthraquinone/kg body mass [BM]).

Example 1

California Vole Feeding Experiment

For the purpose of identifying an effective chemical repellent for wild rodents, this experiment involved concentration-response testing of the anthraquinone-based repellent with California voles in captivity. The maintenance diet for California voles included rodent blocks (LabDiet® 5001; Land O'Lakes, St. Louis, Mo., USA) and apple slices. Thirty eight California voles (experimentally-naïve) were available for this feeding experiment. All voles acclimated within individual cages for five days (Wednesday-Sunday). During the acclimation period, one food bowl that contained untreated oats (ad libitum) was presented on the north side of each cage at 0800 h, daily.

During the three days subsequent to the acclimation period (Monday-Wednesday), one bowl (30.0 g untreated oats) was presented on the north side of each cage at 0800 h, daily. Daily food consumption (including spillage and desiccation) was measured (±0.1 g) at approximately 0800 h on Tuesday-Thursday. Voles were ranked based upon average, pre-test consumption and assigned to one of four test groups at the conclusion of the pretest (n=8-10 voles per group) such that each group was similarly populated with voles that exhibited high-low daily consumption (Werner et al., 2009, 2010, 2011a,b). Test treatments among groups (i.e. experimental units) were randomly assigned.

On the day subsequent to the pre-test (Thursday), one bowl (30.0 g anthraquinone-treated oats) was presented on the north side of each cage at 0800 h. Voles in Groups 1-4 received whole oats treated with 0.25%, 0.5%, 1.0%, or 2.0% anthraquinone, respectively (target concentrations, wt/wt). Daily food consumption (including spillage and desiccation) was measured at approximately 0800 h on Friday.

California voles exposed to whole oats treated with 0.25-2.0% anthraquinone exhibited 24-84% repellency during the concentration-response experiment (FIG. 1). Actual anthraquinone concentrations from our anthraquinone-treated oats ranged from 2,050-18,300 ppm anthraquinone (FIG. 1). Thus, California voles exhibited 84% repellency for whole oats treated with 18,300 ppm anthraquinone, or 365.0±103.1 mg anthraquinone/kg BM (mean vole BM=38.1 g). Vole repellency (y) was a function of anthraquinone concentration (x):y=26.828 ln(x)−174.795 ($r^2$=0.95, P=0.0267). A threshold concentration of about 13,400 ppm anthraquinone was predicted for California voles offered treated oats. The results of this laboratory efficacy experiment suggest that a threshold concentration of 1.3% anthraquinone (wt/wt) can effectively repel California voles from treated food.

Another experiment was conducted to illustrate the repellency of an UV-absorbent feeding cue subsequent to two-day exposure to an UV-absorbent, postingestive repellent (i.e., 9,10-anthraquinone) in a dichromatic animal, the California vole (*Microtus californicus*). Sixteen California voles (voles) were each offered two bowls of untreated oats for three days. Voles were ranked based upon average pre-test consumption and assigned to one of two test groups at the conclusion of the pre-test (n=8 voles per test group). Test treatments (i.e. repellent-exposed, unexposed) were then randomly assigned among test groups.

During the two-day exposure period, voles in the unexposed group were offered untreated oats in both food bowls, daily. For the purpose of establishing the cognitive association between UV-absorbent food and its negative postingestive consequence, voles in the repellent-exposed group were offered oats treated with 0.25% anthraquinone (target concentration; wt/wt) in both food bowls, daily (Werner et al. 2008, 2012, 2014a).

During the four-day test, all voles were offered one bowl of untreated oats and one bowl of oats treated with 0.2% of an UV-absorbent feeding cue (Werner et al. 2012, 2014a,b), daily. The UV-treated oats were randomly placed on the first day and thereafter alternated treatment locations within all test cages, daily, throughout the test. Daily oat consumption was measured on the day subsequent to each test day.

Figure 5:
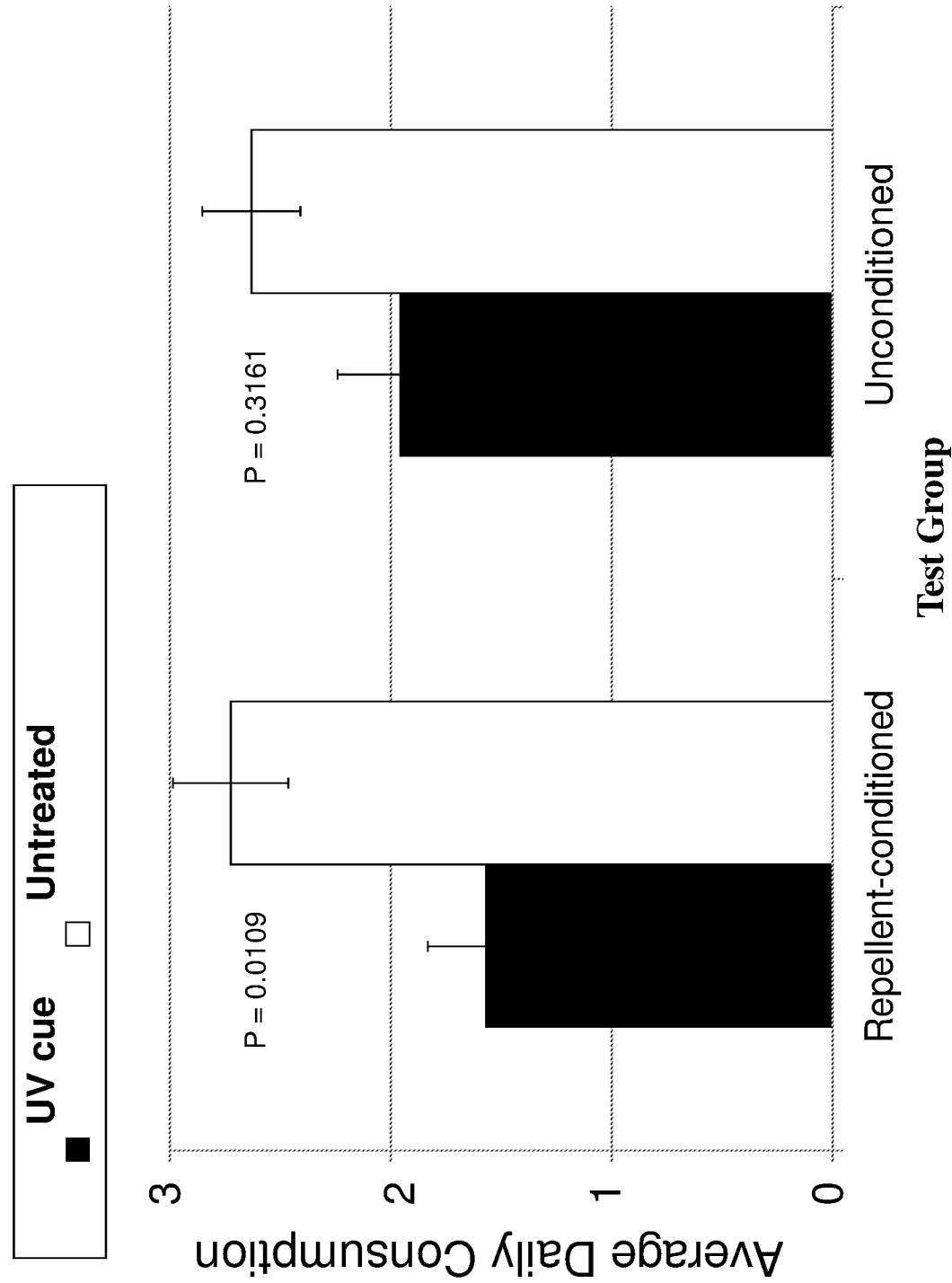
FIG. 5 is a bar graph that illustrates repellency of an UV-absorbent visual cue subsequent to exposure to an UV-absorbent, postingestive repellent in a dichromatic rodent, the California vole (*Microtus californicus*). Mean consumption (±S.E.M.) of whole oats offered to California voles (*Microtus californicus* Peale; n=8 per test group). Voles were offered untreated whole oats and those treated with 0.2% of an UV feeding cue (active ingredient: titanium dioxide; Evonik Goldschmidt Corporation) throughout the four-day test. The repellent-conditioned test group was exposed to an UV, postingestive repellent prior to the test.

A statistically significant treatment effect was observed between treatment groups (i.e. group-by-treatment interaction; P=0.0146). Voles that were exposed to the UV-absorbent, postingestive repellent subsequently avoided UV-absorbent oats relative to untreated oats throughout the four-day test (i.e. 42% repellency was observed in repellent-exposed group; P=0.0109; FIG. 5). In contrast, voles that were not exposed to the UV-absorbent, postingestive repellent consumed similar amounts of untreated oats and oats treated with the UV-absorbent feeding cue during the test (i.e., <1% repellency was observed in repellent-unexposed, or control group; P=0.3161; FIG. 5). Thus, a dichromatic animal responded behaviorally to an UV absorbent feeding cue.

These data demonstrate that, in the absence of pre-test exposure to the repellent, consumption of food treated with the UV-absorbent cue was not different than that of untreated food. Subsequent to exposure to the UV-absorbent, postingestive repellent, however, dichromatic animals significantly avoided the UV-absorbent cue during the test. Thus, by using visual cue agents that exhibit spectral characteristics sufficiently similar to the previously-applied repellent treatment (e.g. 10-50 nm), the amount of the repellent agent may be reduced (or even omitted; Example 3) and yet effectively repel dichromatic animals. The synergy observed in this Example was characterized by greater behavioral response to the combination of a visual cue and a repellent relative to the behavioral response observed for the visual cue alone (i.e. not in combination with the repellent).

Example 2

Richardson's Ground Squirrel Feeding Experiment

This experiment involved concentration-response testing of the anthraquinone-based repellent with Richardson's ground squirrels in captivity. The maintenance diet for Richardson's ground squirrels included rodent blocks (Lab-Diet® 5001; Land O'Lakes, St. Louis, Mo., USA), apple slices and carrots. The test procedures of our previous concentration-response experiment were replicated with 28 Richardson's ground squirrels (experimentally-naïve) within individual cages (i.e. acclimation, pre-test, test). Test groups 1-3 (n=9-10 ground squirrels per group) received whole oats treated with 0.5%, 1.0%, or 2.0% anthraquinone (target concentrations, wt/wt), respectively, during the test.

Figure 2:
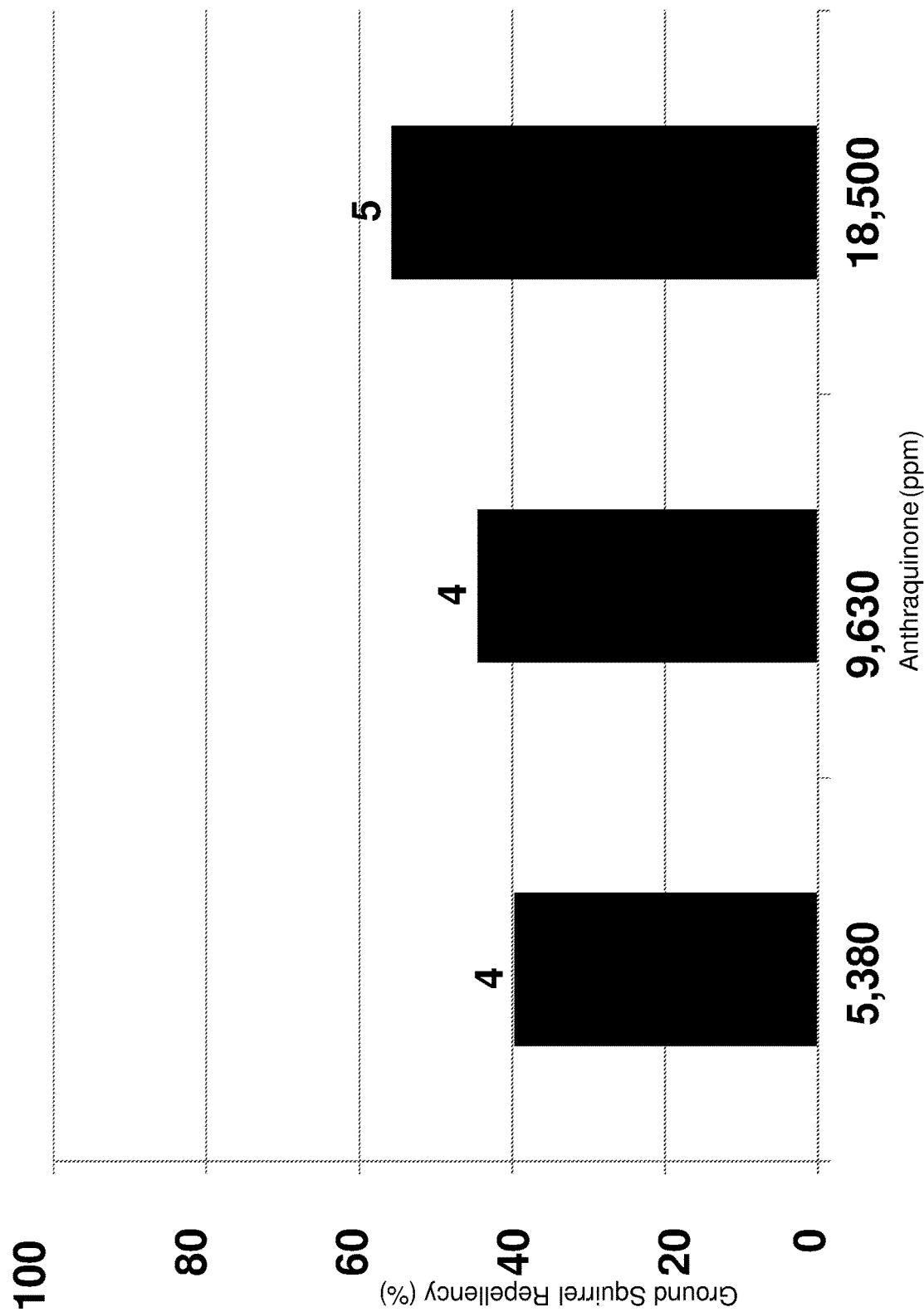
FIG. 2 is a bar graph that illustrates repellency of an UV-absorbent, postingestive repellent in a dichromatic animal, Richardson's ground squirrel (*Urocitellus richardsonii* Sabine). Mean feeding repellency associated with varying concentrations of an anthraquinone-based repellent (Avipel® Arkion® Life Sciences, New Castle, Del., USA) offered to Richardson's ground squirrels (*Urocitellus richardsonii* Sabine). Repellency represents test consumption (day 4) relative to average, pretreatment consumption (days 1-3) of untreated whole oats (n=9-10 ground squirrels per repellent concentration).

40-56% feeding repellency was observed among Richardson's ground squirrels offered whole oats treated with target concentrations of 0.5-2.0% anthraquinone (FIG. 2). Actual anthraquinone concentrations from the oat seed treatments ranged from 5,380-18,500 ppm anthraquinone (FIG. 2). Ground squirrel repellency was weakly related to actual anthraquinone concentrations ($r^2$=0.95; P=0.1458). 56% repellency was observed for whole oats treated with 18,500 ppm anthraquinone in Richardson's ground squirrels.

An additional experiment was conducted to illustrate the synergistic repellency of an UV-absorbent, postingestive repellent (i.e., 9,10-anthraquinone) combined with an UV feeding cue (e.g. titanium dioxide) in dichromatic animals, Richardson's ground squirrels (*Urocitellus richardsonii*) and deer mice (*Peromyscus maniculatus*). Up to forty Richardson's ground squirrels (ground squirrels) and up to forty, deer mice (mice) were each offered one bowl of untreated oats for three days. For each experiment, test subjects were ranked based upon average pre-test consumption and assigned to one of four test groups at the conclusion of the pre-test (n=10 test subjects per group). Test treatments were then randomly assigned among test groups. During the one-day test, one bowl of repellent-treated oats was offered to each test subject. Test subjects in Groups 1-4 received oats treated with 0.05%, 0.1%, 0.25% or 0.5% anthraquinone during the test (i.e. target concentrations; wt/wt). Test treatments also included 0.2% of an UV feeding cue (e.g. titanium dioxide). Daily oat consumption was measured on the day subsequent to the test.

Ground squirrels exhibited 30-75% repellency for oats treated with 0.05-0.5% anthraquinone and 0.2% of an UV feeding cue. Mice exhibited 15-75% repellency for oats treated with 0.05-0.5% anthraquinone and 0.2% of an UV feeding cue. Synergistic repellency was observed for food treated an UV-absorbent, postingestive repellent and an UV feeding cue in dichromatic animals.

Example 3

Deer Mouse Feeding Experiment

This experiment involved concentration-response testing of the anthraquinone-based repellent with deer mice in captivity. The maintenance diet for deer mice included rodent blocks (LabDiet® 5001; Land O'Lakes, St. Louis, Mo., USA) and apple slices. The test procedures of our previous concentration-response experiments were replicated with 34 deer mice (experimentally-naïve) within individual cages (i.e. acclimation, pre-test, test). Test groups 1-4 (n=8-9 mice per group) received whole oats treated with 0.25%, 0.5%, 1.0%, or 2.0% anthraquinone (target concentrations, wt/wt), respectively, during the test.

Figure 3:
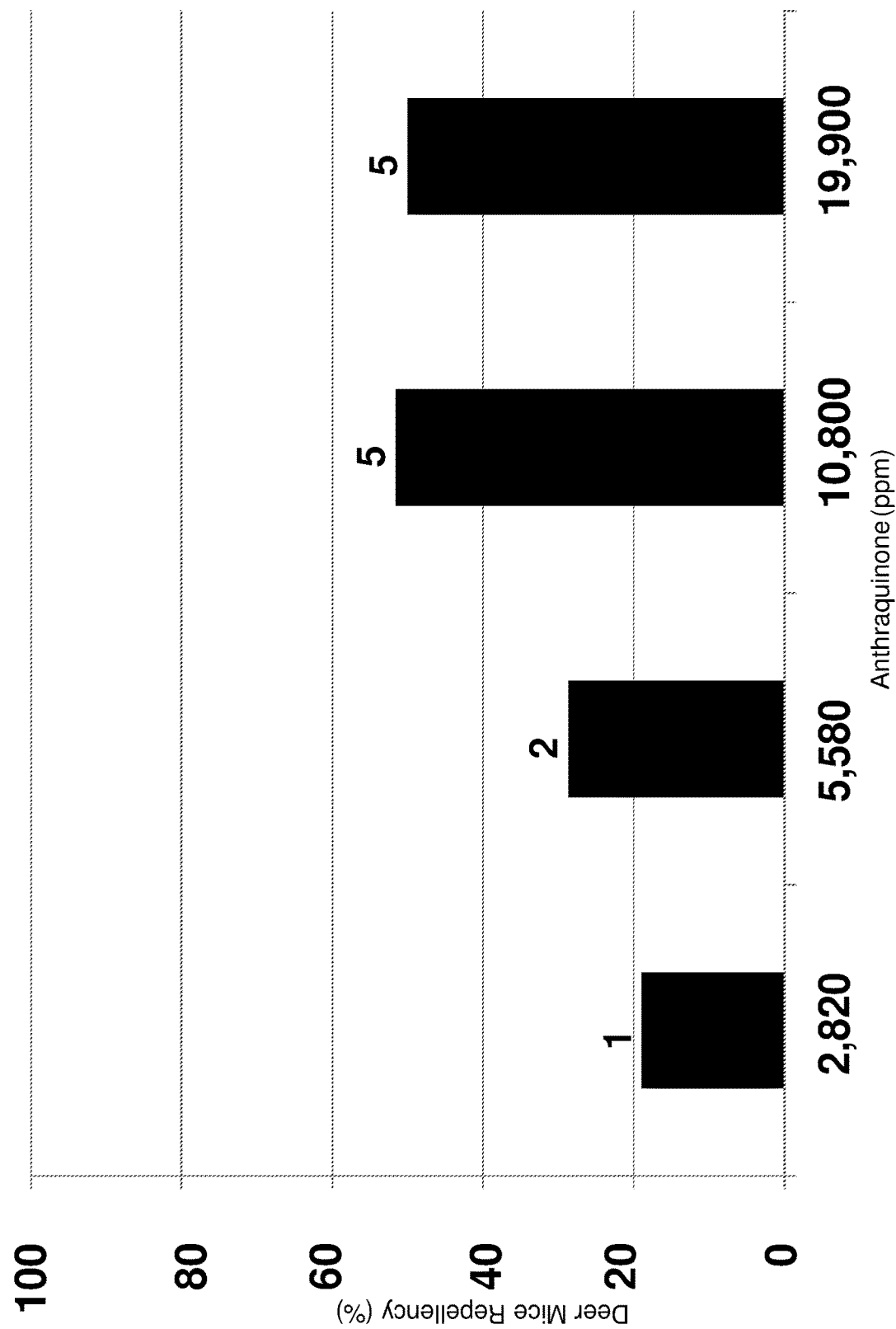
FIG. 3 is a bar graph that illustrates repellency of an UV-absorbent, postingestive repellent in a dichromatic animal, the deer mouse (*Peromyscus maniculatus* Wagner). Mean feeding repellency associated with varying concentrations of an anthraquinone-based repellent (Avipel® Shield; Arkion® Life Sciences, New Castle, Del., USA) offered to deer mice (*Peromyscus maniculatus* Wagner). Repellency represents test consumption (day 4) relative to average, pretreatment consumption (days 1-3) of untreated whole oats (n=8-9 mice per repellent concentration).

Deer mice exposed to whole oats treated with target concentrations of 0.25-2.0% anthraquinone exhibited 19-52% repellency during the concentration-response experiment (FIG. 3). Actual anthraquinone concentrations from our oat seed treatments ranged from 2,820-19,900 ppm anthraquinone (FIG. 3). Deer mouse repellency was weakly related to actual anthraquinone concentrations ($r^2$=0.89; P=0.0580).

52% repellency was observed for whole oats treated with 10,800 ppm anthraquinone in deer mice.

Example 4

Cottontail Rabbit Feeding Experiment

This experiment involved concentration-response testing of the anthraquinone-based repellent with cottontail rabbits in captivity. The maintenance diet for cottontail rabbits included Rabbit Chow® (Purina® Mills, St. Louis, Mo., USA), apple slices and alfalfa hay. The test procedures of our previous concentration-response experiments were replicated with 30 cottontail rabbits (experimentally-naïve) within individual cages (i.e. acclimation, pre-test, test). Test groups 1-3 (n=10 rabbits per group) received whole oats treated with 0.5%, 1.0%, or 2.0% anthraquinone (target concentrations, wt/wt), respectively, during the test.

Figure 4:
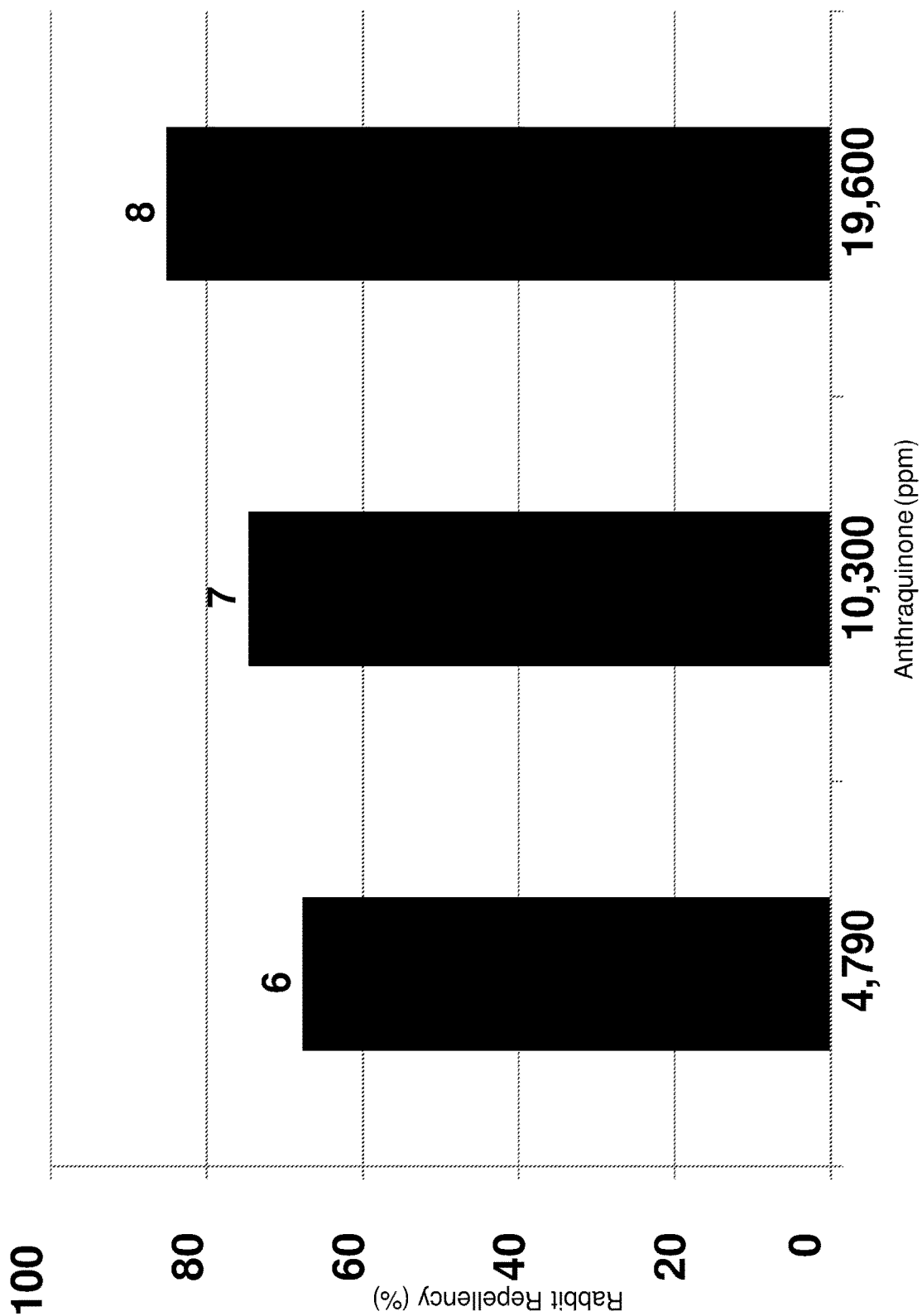
FIG. 4 is a bar graph that illustrates repellency of an UV-absorbent, postingestive repellent in a dichromatic animal, the cottontail rabbit (*Sylvilagus audubonii*). Mean feeding repellency associated with varying concentrations of an anthraquinone-based repellent (Avipel® Shield; Arkion® Life Sciences, New Castle, Del., USA) offered to cottontail rabbits (*Sylvilagus audubonii* Baird). Repellency represents test consumption (day 4) relative to average, pretreatment consumption (days 1-3) of untreated whole oats (n=10 rabbits per repellent concentration).

68-85% feeding repellency was observed among cottontail rabbits offered whole oats treated with target concentrations of 0.5-2.0% anthraquinone (FIG. 4). Actual anthraquinone concentrations from our oat seed treatments ranged from 4,790-19,600 ppm anthraquinone (FIG. 4). Rabbit repellency was weakly related to actual anthraquinone concentrations ($r^2$=0.99; P=0.0757). 85% feeding repellency was observed, however, among rabbits offered whole oats treated with 19,600 ppm anthraquinone. Thus, cottontail rabbits were effectively repelled from whole oats treated with a target concentration of 2.0% anthraquinone (FIG. 4), or 149.9±28.1 mg anthraquinone/kg BM (mean rabbit BM=0.8 kg).

85% repellency was observed for whole oats treated with 19,600 ppm anthraquinone in cottontail rabbits. It is believed that field efficacy testing of foliar repellent applications for the protection of tree seedlings, shrubs, hay, soybean and rangeland forage associated with damages caused by cottontail rabbits can be successfully performed. Field efficacy experiments can include: (1) application strategies that are specifically developed to protect agricultural crops from mammalian depredation; (2) independent field replicates with predicted rodent or rabbit damage; (3) varied application rates based upon species-specific threshold concentrations, including untreated controls; (4) pre- and at-harvest analytical chemistry; (5) crop damage measurements; and (6) crop yield measurements (Werner et al., 2011a).

Another experiment was conducted to illustrate the repellency of an UV-absorbent, postingestive repellent (i.e., 9,10-anthraquinone) in a dichromatic animal, the cottontail rabbit (Sylvilagus audubonii). Thirty cottontail rabbits (rabbits) were each offered one bowl of untreated oats for three days. Rabbits were ranked based upon average pre-test consumption and assigned to one of three test groups at the conclusion of the pre-test (n=10 rabbits per test group). Test treatments were then randomly assigned among test groups. During the one-day test, one bowl of repellent-treated oats was offered to each test subject. Rabbits in Groups 1-3 received oats treated with 0.5%, 1% or 2% anthraquinone during the test (i.e. target concentrations; wt/wt). Daily oat consumption was measured on the day subsequent to the test.

Rabbits exhibited 68%, 75% and 85% repellency for oats treated with 4,790 ppm, 10,300 ppm and 19,600 ppm anthraquinone, respectively (actual concentrations determined via high performance liquid chromatography; FIG. 4). Thus, similar to tetrachromatic birds with retinal cones that are maximally sensitive to UV wavelengths (Werner et al. 2009, 2011, 2014a,b), a dichromatic animal exhibited efficacious repellency for food treated an UV-absorbent, postingestive repellent.

A further experiment was conducted to illustrate the synergistic repellency of an UV-absorbent, postingestive repellent (i.e., 9,10-anthraquinone) combined with an UV feeding cue (e.g. titanium dioxide) in a dichromatic animal, the cottontail rabbit (Sylvilagus audubonii). Thirty cottontail rabbits (rabbits) were each offered one bowl of untreated oats for three days. For the first and second experiments, test subjects were ranked based upon average pre-test consumption and assigned to one of three and one of four test groups at the conclusion of the pre-test, respectively. Test treatments were then randomly assigned among test groups. During the one-day test, one bowl of repellent-treated oats was offered to each test subject. For the first experiment, test subjects received oats treated with 0.5%, 1% or 2% anthraquinone and 0.2% of an UV feeding cue (titanium dioxide) during the test (i.e. target concentrations; wt/wt). For the second experiment, Groups 1 & 2 received oats treated with 0.1% or 0.25% anthraquinone during the test (i.e. target concentrations; wt/wt); Groups 3 & 4 received oats treated with 0.1% or 0.25% anthraquinone and 0.2% of the UV feeding cue. Daily oat consumption was measured on the day subsequent to the tests for each of Experiments 1 & 2.

Relative to the prior experiment 1, rabbits in the earlier experiment exhibited up to 3% greater repellency for oats treated with 0.5-2% anthraquinone and 0.2% of an UV feeding cue. Relative to the repellency of oats treated only with the anthraquinone repellent, rabbits in the later experiment exhibited up to 5% greater repellency for oats treated with a combination of 0.1-0.25% anthraquinone and the UV feeding cue.

A synergistic repellency was observed for food treated an UV absorbent, postingestive repellent and an UV feeding cue in dichromatic animals. The synergy observed in this Example was characterized by greater behavioral response to the combination of a visual cue and a repellent relative to the behavioral response observed for the repellent alone (i.e., not in combination with the visual cue).

Example 5

Conditioned Avoidance Experiment with Ultraviolet Feeding Cue

Unlike most tested birds (Aidala et al., 2012, Bennett and Cuthill, 1994 and Cuthill et al., 2000), most tested mammals do not exhibit UV vision (Honkavaara et al., 2002, Hut et al., 2000, Jacobs, 1992, Jacobs and Yolton, 1971, Jacobs et al., 1991 and Tovee, 1995). Anthraquinone-based repellents provide the negative postingestive consequences and a relevant UV feeding cue necessary to condition avoidance of UV-treated food (Werner et al., 2012, 2014a). Conditioned avoidance of UV-treated food subsequent to anthraquinone conditioning was tested in California voles. Seed treatments for the conditioned avoidance experiment were formulated by applying aqueous suspensions (60 ml/kg) to the test diet using a rotating mixer and household spray equipment (Werner et al., 2012, 2014b).

Sixteen California voles (experimentally naïve) were used for this feeding experiment. The maintenance diet (apple slices and LabDiet® 5001, Land O'Lakes St. Louis, Mo., USA) and water was again provided to all voles within individual cages, daily. The anthraquinone-based repellent (Avipel® Shield; Arkion® Life Sciences, New Castle, Del., USA) and a titanium dioxide feeding cue (Aeroxide® P25; Acros Organics, Fair Lawn, N.J., U.S.A.) were used for the conditioned avoidance feeding experiment (Werner et al., 2012, 2014a,b). A Genesys™ 2, 336002 spectrophotometer (Thermo Spectronic US, Rochester, N.Y., US) was previously used to determine that both the anthraquinone based repellent and the titanium dioxide feeding cue absorb near UV wavelengths (Werner et al., 2012).

All voles acclimated within individual cages for five days (Wednesday-Sunday, Week 1). Two food bowls (east and west side of each cage) of unadulterated oats were provided throughout the acclimation period. Two food bowls (unadulterated oats on east and west sides of cage) were presented at approximately 0800 h, daily for two days subsequent to acclimation (Monday and Tuesday; Week 2). Cages were ranked based upon pre-test consumption, assigned cages to one of two groups, and randomly assigned treatments between groups at the completion of the pre-test.

Two food bowls (east and west side of cage) were presented at approximately 0800 h, daily for two days subsequent to the pre-test (Wednesday and Thursday; Week 2). For the purpose of behavioral conditioning with the UV-absorbent, postingestive repellent, all voles in the conditioned group (Group 1; n=8) were exposed to oats treated with 0.25% anthraquinone (target concentration, wt/wt) in both food bowls. All voles in the unconditioned group (Group 2; n=8) were exposed to unadulterated oats in both food bowls. Two food bowls were presented of the maintenance diet from approximately 0930 on Friday (Week 2) through 0800 h on Monday (Week 3) to all test subjects.

Two food bowls were presented at approximately 0800 h, daily for four test days (Monday-Thursday; Week 3). For the purpose of preference testing with the UV-absorbent feeding cue subsequent to behavioral conditioning, Groups 1 and 2 received oats treated with 0.2% of the UV cue in one bowl, and untreated oats in the alternate bowl, daily. UV treated oats were randomly located on the first test day (i.e. east or west side of cage) and thereafter alternated daily throughout the test such that UV treated and untreated oats were each offered twice on the east and west side of each cage. Oat consumption was individually measured in east and west food bowls in each cage throughout the test (i.e. approximately 0800 h, Tuesday-Friday; Week 3).

The dependent measure of the conditioned avoidance experiment was average (i.e. daily) test consumption of treated and untreated food. After conducting Levene's test for equal variances ($\alpha$=0.05) and affirmatively inspecting the normality of residuals, consumption data were subjected to a Welch's analysis of variance. The group-by-treatment interaction was analyzed using a general linear model (SAS v9.1). Tukey-Kramer multiple comparisons were used to separate the means of the significant interaction ($\alpha$=0.05). Descriptive statistics ($\bar{x}\pm$S.E.M.) were used to summarize consumption of treated and untreated food throughout the conditioned avoidance experiment.

The two test groups consumed different amounts of UV-treated and untreated food during the four-day test ($F_{3,67}$=4.48, P=0063). Relative to the consumption of untreated oats, voles conditioned with the UV-absorbent, postingestive repellent consumed fewer oats treated only with the UV-absorbent cue throughout the test (i.e. repellent-conditioned, FIG. 5). The repellent-conditioned group consumed an average of 1.6±0.3 g of UV-treated whole oats and 2.7±0.3 g of untreated oats per day, throughout the test (Tukey-Kramer P=0.0109).

In contrast, unconditioned voles consumed similar amounts of UV-treated oats and untreated oats throughout the test (FIG. 5). The unconditioned group consumed an average of 2.0±0.3 g of UV-treated whole oats and 2.6±0.2 g of untreated oats per day, throughout the test (Tukey-Kramer P=0.3161). Thus, without prior conditioning with the UV-absorbent, postingestive repellent, the UV-absorbent cue was not itself aversive to California voles. Moreover, although California voles are not maximally sensitive to UV wavelengths, voles conditioned with the UV-absorbent, postingestive repellent subsequently consumed less food treated only with the UV-absorbent cue.

Because California voles consumed less of the test diet treated only with the UV-absorbent feeding cue subsequent to conditioning with the UV-absorbent, postingestive repellent (i.e. relative to the unconditioned control group; FIG. 5), we observed cue-consequence specificity (Domjan, 1985) for an UV visual cue and a postingestive repellent in a dichromatic rodent. Thus, similar to blackbirds (Werner and Provenza, 2011), California voles cognitively associate pre- and postingestive consequences with visual cues, and reliably integrate visual and gustatory experience with postingestive consequences to procure nutrients and avoid toxins. These visual cues include UV-absorbent and UV-reflective cues for mammalian feeding behavior. The behavioral responses of this study can be exploited as a repellent application strategy for the protection of agricultural resources. This application strategy comprises a postingestive repellent and a feeding cue with visual characteristics sufficiently similar to the repellent such that the repellent concentration can be decreased (i.e. to include 0% of the chemical repellent subsequent to repellent exposure, FIG. 5) whilst maintaining or synergistically increasing repellent efficacy (Werner et al., 2014b).

The repellent application strategy described herein (i.e. UV, postingestive repellent and associated UV visual cue) has implications for several wild rodents and rabbits. Although the spectral sensitivity function peaks at 520 nm in California ground squirrels (i.e. VS visual pigments; *Otospermophilus beecheyi*; Anderson and Jacobs, 1972), the lens of Mexican ground squirrels (*Ictidomys mexicanus*) exhibits $\lambda_{max}$ of 265-370 nm (i.e. UVS visual pigments; Cooper and Robson, 1969). In Richardson's ground squirrels, 50% of incident illumination is transmitted at 462 nm and 0.6% of light from 315-400 nm is transmitted by the lens (Douglas and Jeffrey, 2014). Although shortwave sensitive cones (S) constitute only 5-15% of the cones in deer mice, partial sequencing of the S opsin gene suggested UV sensitivity of the S cone visual pigment (Arbrogast et al., 2013). In house mice, 50% of incident illumination is transmitted at 313-337 nm and 81.7% of light from 315-400 nm is transmitted by the lens (Douglas and Jeffrey, 2014). The maximum optical transmittance (i.e. 94-96%) in albino rabbits was found between 630-730 nm; transmittance decreased to 50% at 400 nm and <1% at 380 nm (Algvere et al., 1993). In rabbits (*Oryctolagus cuniculus* Linnaeus), 50% of incident illumination is transmitted at 392 nm and 12.7% of light from 315-400 nm is transmitted by the lens (Douglas and Jeffrey, 2014). Based on the testing herein commercial development (e.g. pricing of optimized formulations) of a repellent application strategy comprising an UV, postingestive repellent and an associated UV feeding cue can be performed for wild rodents and rabbits.

52-56% feeding repellency was observed for whole oats treated with 10,800 ppm anthraquinone or 18,500 ppm anthraquinone in mice and squirrels, and 84-85% repellency for oats treated with 18,300 ppm anthraquinone or 19,600 ppm anthraquinone in voles and rabbits, respectively. Considerable interspecies variation was observed in the feeding behavior of these wild mammals offered food treated with the anthraquinone-based repellent. Similarly, it was predicted a threshold concentration of 1,450-1,475 ppm anthraquinone for Canada geese and red-winged blackbirds, 5,200 ppm anthraquinone for American crows, 9,200 ppm anthraquinone for common grackles (*Quiscalus quiscula* Linnaeus) and 10,450 ppm anthraquinone for ring-necked pheasants (Werner et al, 2009, 2011a, 2015). Thus, anthraquinone repellency is not inversely proportional to the body mass of the target animal and considerable interspecific variation exists for anthraquinone among tested mammals and birds. Species-specific efficacy may be required and treatment amounts determined for each further target animal under laboratory and field conditions.

Relative to unconditioned test subjects, voles conditioned with the UV, postingestive repellent subsequently avoided whole oats treated only with an UV cue. Similarly, red-winged blackbirds conditioned with the UV, postingestive repellent subsequently avoided UV-treated food relative to unconditioned blackbirds (Werner et al. 2012). This ultraviolet strategy for repellent applications was recently developed for wild birds associated with agricultural crop depredation (Werner 2015). Relative to the repellency of food treated only with the anthraquinone-based repellent, synergistic repellency (i.e. 45-115% increase) was observed when 0.2% of the UV feeding cue was combined with 0.02% or 0.035% anthraquinone (wt/wt; Werner et al. 2014b). This ultraviolet strategy for repellent applications is applicable for the management of damages caused by wild rodents and rabbits to plant and animal agriculture.

Among the wild mammals that we have experimentally offered food treated with 0.25-2% anthraquinone (wt/wt), the ranked efficacy of anthraquinone-based repellents in order of high-low repellency was cottontail rabbits (68-85% repellency), California voles (24-84% repellency), Richardson's ground squirrels (40-56% repellency), deer mice (19-52% repellency) and black-tailed prairie dogs (24-37% repellency; Werner et al. 2011b). Interestingly, the transmittance of UVA wavelengths (315-400 nm) through the ocular media was estimated to be 13%, 0.6% and 0% in European rabbits (*Oryctolagus cuniculus* Linnaeus), Richardson's ground squirrels and black-tailed prairie dogs, respectively (Douglas and Jeffery, 2014). Thus, the efficacy of this UV, postingestive repellent is directly proportional to the known transmittance of UVA wavelengths in these wild mammals. The development of non-lethal, UV repellent application strategies for wild mammals associated with human-wildlife conflicts can be performed.

Because inconsistent success has been observed among rodent repellent trials conducted under laboratory and field conditions, a progression of efficacy experiments (i.e. cage, then enclosure, then field studies) has been recommended for the reliable measurement of repellency and the successful development of non-lethal wildlife repellents (Hansen et al, 2016b). Field enclosure experiments can be performed to further evaluate anthraquinone-based repellents and ultraviolet application strategies. The results of the present experiments can enable the design of supplemental field efficacy experiments and the development of non-lethal repellents for wild rodents, rabbits and other wildlife associated with human-wildlife conflicts.

The experiments contained herein provide a novel investigation of an anthraquinone-based repellent and related visual cues for wild rodents and rabbits associated with damages to agricultural resources. 52-56% feeding repellency was observed for whole oats treated with 10,800 ppm anthraquinone or 18,500 ppm anthraquinone in deer mice and Richardson's squirrels, and 84-85% repellency for oats treated with 18,300 ppm anthraquinone or 19,600 ppm anthraquinone in California voles and cottontail rabbits, respectively. Relative to unconditioned test subjects, voles conditioned with the UV, postingestive repellent subsequently avoided whole oats treated only with an UV cue. Thus, California voles cognitively associate pre- and postingestive consequences with visual Cues, and reliably integrate visual and gustatory experience with postingestive consequences to procure nutrients and avoid toxins. These behavioral responses to anthraquinone-based repellents and UV feeding cues are described herein as a repellent application strategy (or method) for the non-lethal management of agricultural depredation caused by wild mammals. These methods can comprise a postingestive repellent and a feeding cue with visual characteristics sufficiently similar to the repellent such that the repellent concentration can be decreased whilst maintaining or increasing repellent efficacy.

Example 6

Three additional experiments were performed to illustrate the attractiveness of bait formulations including an UV feeding cue in dichromatic animals, cottontail rabbits (*Sylvilagus audubonii*), Richardson's ground squirrels (*Urocitellus richardsonii*) and deer mice (*Peromyscus maniculatus*). For each experiment, up to forty test subjects were each offered one bowl of untreated oats for three days. Test subjects were ranked based upon average pre-test consumption and assigned to one of four test groups at the conclusion of the pre-test (n=10 test subjects per group). Test treatments were then randomly assigned among test groups. During the one-day test, one bowl of attractant-treated oats was offered to each test subject. Test subjects in Groups 1-4 received oats topically-treated with an attractant (e.g. apple, molasses or peanut flavoring) and 0, 0.7, 0.14 or 0.2% of an UV feeding cue (e.g. titanium dioxide). Daily oat consumption was measured on the day subsequent to the test.

Relative to pre-test consumption of untreated oats, rabbits, ground squirrels and mice exhibited 40-85% more consumption of test treatments including 0-0.2% of the feeding cue. A synergistic attraction was observed for food treated an attractant and an UV feeding cue in dichromatic animals.

Example 7

The below, 9,10 Anthraquinone formulation, which is effective for dichromatic animals when applied to surfaces at the rates set forth in this application, is suitable for application to any solid or plant surface:

| | |
|---|---|
| AQ | <0.5% or >10% |
| Visual Cue | 0.1-50% |
| Water | 25-35% |
| Polyethylene Glycol | 2-3% |
| Surfactants | 1-3% |
| Thickeners | (1-3%) |

Example 8

Table 1 illustrates decreased behavioral response (prophetic) to a repellent formulation including a wavelength-specific repellent agent plus a wavelength-specific visual cue agent in dichromatic animals, the cottontail rabbit (*Sylvilagus* spp., CORA), deer mouse (*Peromyscus* spp., DEMI), house mouse (*Mus* spp., HOMI) and Richardson's ground squirrel (*Urocitellus richardsonii*, RGS).

TABLE 1

Decreased behavioral response to a repellent formulation including a wavelength-specific repellent agent plus a wavelength-specific visual cue agent in dichromatic animals

| Repellent Conc. | Seed Treatment Repellency (%) | | | | Surface Treatment Repellency (%) | | | |
|---|---|---|---|---|---|---|---|---|
| (wt/wt) | CORA | DEMI | HOMI | RGS | CORA | DEMI | HOMI | RGS |
| 0.5% | 80 | 50 | 50 | 60 | 80 | 50 | 50 | 60 |
| 1.0% | 90 | 75 | 75 | 75 | 90 | 75 | 75 | 75 |
| 2.0% | 100 | 90 | 90 | 90 | 100 | 90 | 90 | 90 |

Example 9

Table 2 illustrates increased behavioral response (prophetic) to an attractant formulation including a wavelength-specific attractant agent plus a wavelength-specific visual cue agent in dichromatic animals, the cottontail rabbit (*Sylvilagus* spp.), deer mouse (*Peromyscus* spp.), house mouse (*Mus* spp.) and Richardson's ground squirrel (*Urocitellus richardsonii*).

TABLE 2

Increased behavioral response to an attractant formulation including a wavelength-specific repellent agent plus a wavelength-specific visual cue agent in dichromatic animals

| Attractant Conc. | Seed Treatment Attraction (%) | | | | Surface Treatment Attraction (%) | | | |
|---|---|---|---|---|---|---|---|---|
| (wt/wt) | CORA | DEMI | HOMI | RGS | CORA | DEMI | HOMI | RGS |
| 0.5% | 80 | 50 | 50 | 60 | 80 | 50 | 50 | 60 |
| 1.0% | 90 | 75 | 75 | 75 | 90 | 75 | 75 | 75 |
| 2.0% | 100 | 90 | 90 | 90 | 100 | 90 | 90 | 90 |

REFERENCES

Agnello, A. M., Kain, D. P., Gardner, J., Curtis, P. D., Ashdown, M. L., Hoffmann, M. P., 2014. Novel barriers to prevent dogwood borer (*Lepidoptera: Sesiidae*) and rodent damage in apple plantings. J. Econ. Entomol. 107, 1179-1186.

Aidala, Z., Huynen, L., Brennan, P. L. R Musser, J., Fidler, A., Chong, N., Machovsky Capuska, G. E., Anderson, M. G., Talaba, A., Lambert, D., Hauber, M. E., 2012. Ultraviolet visual sensitivity in three avian lineages: paleognaths, parrots, and passerines. J. Comp. Physiol. A 198, 495-510.

Algvere, P. V., Torstensson, P. L. Tengroth, B. M., 1993. Light transmittance of ocular media in living rabbit eyes. Invest. Ophthal. Vis. Sci. 34, 349-354.

Anderson, D. H., Jacobs, G. H., 1972. Color vision and visual sensitivity in the California ground squirrel (*Citellus beecheyi*). Vision Res. 12, 1995-2004.

Arbogast, P., Glosmann, M., Peichl, L., 2013. Retinal cone photoreceptors of the deer mouse *Peromyscus maniculatus*: development, topography, opsin expression and spectral tuning, PLoS One 8 (11), e80910.

Avery, M. L., Humphrey, J. S., Decker, D. G., 1997. Feeding deterrence of anthraquinone, anthracene, and anthrone to rice-eating birds. J. Wildl. Manage. 61, 1359-1365, Avery, M. L., Humphrey, J. S., Primus, T. M., Decker, D. G., McGrane, A. P., 1998. Anthraquinone protects rice seed from birds. Crop Prot. 17, 225-230.

Baldwin, R. A., Salmon, T. P., Schmidt, R. H., Timm, R. M., 2013. Wildlife pests of California agriculture: regional variability and subsequent impacts on management. Crop Prot. 46, 29-37.

Baldwin, R. A., Salmon, T. P., Schmidt, R. H., Timm, R. M., 2014. Perceived damage and areas of needed research for wildlife pests of California agriculture. Int. Zool. 9, 265-279.

Bennett, A. T. D., Cuthill, I. C., 1994. Ultraviolet vision in birds: what is its function? Vision Res. 34, 1471-1478, Blackwell, B. F., Seamans, T. W., Dolbeer, R. A., 1999. Plant growth regulator (Stronghold™) enhances repellency of anthraquinone formulation (Flight Control™) to Canada geese. J. Widl. Manage. 63, 1336-1343.

Blackwell, B. F., Helon, D. A., Dolbeer, R. A., 2001. Repelling sandhill cranes from corn: whole-kernel experiments with captive birds. Crop Prot. 20, 65-68.

Carlson, J. C., Tupper, S. K., Werner, S. J., Pettit, S. E., Santer, M. M., Linz, G. M., 2013. Laboratory efficacy of an anthraquinone-based repellent for reducing bird damage to ripening corn. Appl. Anim. Behav. Sci. 145, 26-31.

Clapperton, B. K., Day, T. D., Morgan, D. K. J., Huddart, F., Cox, N., Matthews, L. R., 2015. Palatability and efficacy to possums and rats of pest control baits containing bird repellents. NZ. J. Zool. 42, 104-118.

Cooper, G. F., Robson, J. G., 1969. The yellow colour of the lens of the grey squirrel (*Sciurus carolinensis leucotis*). J. Physiol, 203, 403-410.

Cowan, P., Brown, S., Forrester, G., Booth, L., Crowell, M., 2015. Bird-repellent effects on bait efficacy for control of invasive mammal pests. Pest Manage. Sci. 71, 1075-1081.

Cowing, J. A., Poopalasundaram, S., Wilkie, S. F., Robinson, P. R., Bowmaker, J. K., Hunt, D. M., 2002. The molecular mechanism for the spectral shifts between vertebrate ultraviolet- and violet-sensitive cone visual pigments. J. Biochem, 367, 129-135.

Cummings, J. L., Avery, M. L., Mathre, O., Wilson, E. A., York, D. L., Engeman, R. M., Pochop, P. A., Davis, J. E., Jr., 2002a. Field evaluation of Flight Control™ to reduce blackbird damage to newly planted rice. Wildl. Soc. Bull. 30, 816-820.

Cummings, J. L., Pochop, P. A., Engeman, R. M., Davis, J. E., Jr., Primus, T. M., 2002b. Evaluation of Flight Control® to reduce blackbird damage to newly planted rice in Louisiana. Int. Biodeterior. Biodegrad. 49, 169-173.

Cummings, J. L., Byrd, R. W., Eddleman, W. R., Engeman, R. M., Tupper, S. K., 2011. Effectiveness of AV-1011® to reduce damage to drill-planted rice from blackbirds, J. Wildl. Manage. 75, 353-356.

Cuthill, I. C., Partridge, J. C., Bennett, A. T. D., Church, S. C., Hart, N. S., Hunt, S., 2000. Ultraviolet vision in birds. Adv. Study Behav, 29, 159-214, David-Gray, Z. K., Bellingham, J., Munoz, M., Avivi, A., Nevo, E., Foster, R. G., 2002. Adaptive loss of ultraviolet-sensitive/violet-sensitive (UVS/VS) cone opsin in the blind mole rat (*Spalax ehrenbergi*). Eur. J. Neurosci. 16, 1186-1194.

Dolbeer, R. A., Seamans, T. W., Blackwell, B. F., Belant, J. L., 1998. Anthraquinone formulation (Flight Control™) shows promise as avian feeding repellent. J. Wildl. Manage, 62, 1558-1564.

Domjan, M., 1985. Cue-consequence specificity and long-delay learning revisited. Ann. N.Y. Acad. Sci. 443, 54-66.

Douglas, R. H., Jeffery, G., 2014. The spectral transmission of ocular media suggests ultraviolet sensitivity is widespread among mammals. Proc. Royal Soc. B. 281, 20132995.

Dugger, S., Dey, D. C., Millspaugh, J. J. 2004. Vegetation cover affects mammal herbivory on planted oaks and success of reforesting Missouri River bottomland fields. Connor, K. R. ed. 2004 Proc. Of the 12$^{th}$ biennial southern silvicultural research conference. Gen. Tech. Rep. SRS-71. Asheville, N.C.: U.S. Dept. of Agric., Forest Service, Southern Research Station, Gebhardt, K., Anderson, A. M., Kirkpatrick, K. N., Shwiff, S. A., 2011. A review and synthesis of bird and rodent damage estimates to select California crops. Crop Prot. 30, 1109-1116.

Giusti, G. A., 2004. Assessment and monitoring of California vole (*Microtus californicus*) feeding damage to a coastal redwood (*Sequoia sempervirens*) restoration project. Proc. Vertebr. Pest Conf. 21, 169-173.

Gurney, J. E., Watkins, R. W., Gill, E. L., Cowan, D. P., 1996. Non-lethal mouse repellents: evaluation of cinnamamide as a repellent against commensal and field rodents. Appl. Anim. Behav. Sci. 49, 353-363.

Hansen, S. C., Stolter, C., Jacob, J., 2015. The smell to repel: the effect of odors on the feeding behavior of female rodents. Crop Prot, 78, 270-276.

Hansen, S. C., Stolter, C., Jacob, J., 2016a. Effect of plant secondary metabolites on feeding behavior of microtine and arvicoline rodent species. J. Pest Sci. 89, 955-963.

Hansen, S. C., Stolter, C., Imholt, C., Jacob, J., 2016b. Plant secondary metabolites as rodent repellents: a systematic review. J. Chem. Ecol. DOI 10.1007/s10886-016-0760-5 (in press).

Heckmanns, F., Meisenheimer, M., 1944. Protection of seeds against birds. U.S. Pat. No. 2,339,335. U.S. Patent Office, Washington, D.C.

Honkavaara, J., Koivula, M., Korpimaki, E., Siitari, H., Viitala, J., 2002. Ultraviolet vision and foraging in terrestrial vertebrates. Oikos 98, 505-511.

Hut, R. A., Scheper, A., Daan, S., 2000. Can the circadian system of a diurnal and a nocturnal rodent entrain to ultraviolet light? J. Comp. Physiol, A 186, 707-715.

Jacob, J., Tkadlec, E., 2010. Rodent outbreaks in Europe: dynamics and damage. In: Rodent outbreaks: ecology and impacts. G. R. Singleton, S. R. Belmain, P. R. Brown, B. Hardy (eds.). Los Bacos, pp 207-224.

Jacobs, G. H., 1992. Ultraviolet vision in vertebrates. Amer. Zool. 32, 544-554.

Jacobs, G. H., Yolton, R. L., 1971. Visual sensitivity and color vision in ground squirrels. Vision Res. 11, 511-537.

Jacobs, G. H., Neitz, J., Deegan, J. F., II, 1991. Retinal receptors in rodents maximally sensitive to ultraviolet light. Nature 353, 655-656.

Johnson, R. J., Timm, R. M., 1987. Wildlife damage to agriculture in Nebraska: a preliminary cost assessment. Proc. of the East. Wildl. Damage Control Conf. 3, 57-65.

Johnson-Nistler, C. M., Knight, J. E., Cash, S. D., 2005. Considerations related to Richardson's ground squirrel control in Montana. Agron. J. 97, 1460-1464, Marsh, R. E., 1998. Historical review of ground squirrel crop damage in California. Int. Biodeterior. Biodegrad. 42, 93-99.

Neff, J. A., 1998 Meanley, B., 1957. Research on bird repellents: bird repellent studies in the eastern Arkansas rice fields. Wildl, Res. Lab., Denver, Colo., 21 pp, Nolte, D. L., Barnett, J. P., 2000. A repellent to reduce mouse damage to longleaf pine seed. Int. Biodeterior. and Biodegred. 45, 169-174.

Nolte, D. L., Mason, J. R., Clark, L., 1993. Avoidance of bird repellents by mice (*Mus musculus*). J. Chem. Ecol. 19, 427-432.

Pearson A. B., Gorenzel, W. P., Salmon, T. P., 2000. Lesser-known vertebrate pests of almonds in California, Proc., Vertebr, Pest Conf., 19, 365-376.

Pelz, H. J. 2003. Current approaches towards environmentally benign prevention of vole damage in Europe. Singleton, G. R., Hinds, L. A., Krebs, C. J., and Spratt, D. M. (Eds.), Rats, mice and people: Rodent biology and management, Canberra: Australian Centre for International Agricultural Research (ACIAR) pp. 233-237, Proulx, G., 2010. Factors contributing to the outbreak of Richardson's ground squirrel populations in the Canadian prairies. Proc. Vertebr. Pest Conf. 24, 213-217.

Salmon, T. P., 2008. Rodents, rodent control, and food safety. Proc. Vertebr Pest Conf. 23, 16 19, Santilli, F., Galardi, L., Russo, C., 2005. Corn appetibility reduction in wild boar (*Sus scrofa* L.) in relationship to the use of commercial repellents. Annali Med. Vet. 58, 213-218.

Sullivan, T. P., D. S. 2008. Vole-feeding damage and forest plantation protection: Large-scale application of diversionary food to reduce damage to newly planted trees. Crop Prot. 27, 775-784.

Sutherland, D., 2003. Fossorial rodent control compositions and methods. U.S. Pat. No. 6,558,684 B1.

Tovee, M. J. 1995. Ultra-violet photoreceptors in the animal kingdom: their distribution and function. Trends Ecol. Evol. 10, 455-160.

Tupper, S. K., Werner, S. J., Carlson, J. C., Pettit, S. E., Wise, J. C., Lindell, C. A., Linz, G. M., 2014. European starling feeding activity on repellent treated crops and pellets. Crop Prot, 63, 76-82.

Werner, S. J., 2015. Ultraviolet strategy for avian repellency. U.S. Pat. No. 9,131,678. U.S. Patent and Trademark Office, Alexandria, Va.

Werner, S. J., Provenza, F. D., 2011. Reconciling sensory cues and varied consequences of avian repellents. Physiol, Behav. 102, 158-163.

Werner, S. J., Carlson, J. C., Tupper, S. K., Santer, M. M., Linz, G. M., 2009. Threshold concentrations of an anthraquinone-based repellent for Canada geese, red-winged blackbirds, and ring-necked pheasants. Appl. Anim. Behav. Sci. 121, 190-196.

Werner, S. J., Linz, G. M., Tupper, S. K., Carlson, J. C., 2010. Laboratory efficacy of chemical repellents for reducing blackbird damage in rice and sunflower crops. J. Wildl. Manage. 74, 1400-1404.

Werner, S. J., Linz, G. M., Carlson, J. C., Pettit, S. E., Tupper, S. K., Santer, M. M., 2011a. Anthraquinone-based bird repellent for sunflower crops. Appl. Anim. Behav. Sci. 129, 162-169.

Werner, S. J., Tupper, S. K., Pettit, S. E., Carlson, J. C., Linz, G. M., 2011b. Anthraquinone repellent to reduce take of non-target birds from zinc phosphide rodenticide applications. Appl. Anim. Behav. Sci. 135, 146-153.

Werner, S. J., Tupper, S. K., Carlson, J. C., Pettit, S. E., Ellis, J. W., Linz, G. M., 2012. The role of a generalized ultraviolet cue for blackbird food selection. Physiol. Behav. 106, 597-601.

Werner, S. J., Buchholz, R., Tupper, S. K., Pettit, S. E., Ellis, J. W., 2014a. Functional significance of ultraviolet feeding cues in wild turkeys. Physiol, Behav, 123, 162-167.

Werner, S. J., DeLiberto, S. T., Pettit, S. E., Mangan, A. M., 2014b. Synergistic effect of an ultraviolet feeding cue for an avian repellent and protection of agricultural crops. Appl. Anim. Behav. Sci. 159, 107-113.

Werner, S. J., Tupper, S. K., Pettit, S. E., Carlson, J. C., Goldade, D. A., Hofmann, N. M., Homan, H. J., Linz. 2014c. Application strategies for an anthraquinone-based repellent to protect oilseed sunflower crops from pest blackbirds. Crop Prot. 59, 63-70.

Werner, S. J., DeLiberto, S. T., Mangan, A. M., Pettit, S. E., Ellis, J. W., Carlson, J. C., 2015. Anthraquinone-based repellent for horned larks, great-tailed grackles, American crows and the protection of California's specialty crops. Crop Prot. 72, 158-162, Williams, S. C., Short, M. R., 2014. Evaluation of eight repellents in deterring eastern cottontail herbivory in Connecticut, Human-Wildl. Interact. 8, 113-122, Witmer, G. W., Moulton, R. S., 2012. Deer mice (*Peromyscus* spp.) biology, damage and management: a review. Proc. Vertebr. Pest Conf. 25, 213-219.

Witmer, G. W., Singleton, G., 2010. Sustained agriculture: the need to manage rodent damage in: Agricultural Production Wager, F. C., pp 1-38.

Witmer, G. W., Sayler, R., Huggins, D., Capelli, J., 2007. Ecology and Management of rodents in no-till agriculture in Washington, USA. Integr. Zool. 2, 154-164.

We claim:

1. A method for changing the behavioral response of a dichromatic animal associated with a target comprising:
providing a composition comprising a wavelength-specific visual cue agent and an repellent agent, wherein the wavelength-specific visual cue agent has spectral characteristics sufficiently similar to the spectral characteristics of the repellent agent, and wherein the spectral characteristics of the wavelength-specific visual cue agent and the repellent agent fall outside of the ranges within which said dichromatic animal is maximally sensitive, such that the wavelength-specific visual cue agent and the repellant agent are not visibly recognized by said dichromatic animal;
applying said composition to said target,
presenting said target to said dichromatic animal,
whereby said dichromatic animal's behavioral response associated with said target is changed at a level of at least 5% greater when said dichromatic animal is presented with a combination of said wavelength-specific visual cue agent and said repellent agent than when presented with only one of said wavelength-specific visual cue agent or said repellent agent; and
wherein said wavelength-specific visual cue agent and repellent agent each exhibits a UV or IR absorbance, reflectance or refraction at a wavelength range of about 100-400 nm or greater than about 700 nm.

2. The method of claim 1 wherein said dichromatic animals are those animals that use only two distinct types of photoreceptors for color vision.

3. The method of claim 1 wherein said targets comprise structures, agricultural fields or crops, seeds, seedlings, orchards, vineyards, livestock feed, fertilizers, pesticides, animal or insect baits, or combinations thereof.

4. The method of claim 3 wherein said crops comprise corn, fruit, grains, grasses, legumes, lettuce, millet, oats, rice, row crops, sorghum, sunflower, tree nuts, turf, vegetables, or wheat.

5. The method of claim 2 wherein said repellent agent is selected from the group consisting of anthraquinones, flutolanil, anthranilates, methiocarb, caffeine, chlorpyrifos, cyhalothrin, methyl phenyl acetate, ethyl phenyl acetate, o-amino acerophenone, 2-amino-4,5-dimethyl ecetophenone, veratroyl amine, cinnamic aldehyde, cinnamic acid, cinnamide, and combinations thereof.

6. The method of claim 1 wherein said visual cue agent is selected from the group consisting of UV-absorbent materials, IR-absorbent materials, UV-reflective materials, IR-reflective materials, UV-refracting materials, IR-refracting materials, human-visible materials, infrared materials, and combinations thereof.

* * * * *